(12) United States Patent  
Eichen et al.

(10) Patent No.: US 9,002,399 B2  
(45) Date of Patent: Apr. 7, 2015

(54) MOBILE PHONE DOCKING STATION MULTI-NETWORK TELEPHONY HUB

(75) Inventors: Elliot G. Eichen, Arlington, MA (US); Rafael Andres Gaviria Velez, Medford, MA (US); Lee N. Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 398 days.

(21) Appl. No.: 13/327,000

(22) Filed: Dec. 15, 2011

(65) Prior Publication Data

US 2013/0155170 A1 Jun. 20, 2013

(51) Int. Cl.
| | |
|---|---|
| H04M 1/00 | (2006.01) |
| H04B 1/38 | (2006.01) |
| H04M 1/04 | (2006.01) |
| H04W 76/02 | (2009.01) |
| H04M 1/725 | (2006.01) |
| H04M 7/00 | (2006.01) |
| H04W 48/18 | (2009.01) |
| H04W 84/04 | (2009.01) |
| H04W 88/10 | (2009.01) |

(52) U.S. Cl.
CPC .............. *H04M 1/04* (2013.01); *H04W 48/18* (2013.01); *H04W 76/02* (2013.01); *H04W 84/045* (2013.01); *H04W 88/10* (2013.01); *H04M 1/72527* (2013.01); *H04M 7/0069* (2013.01)

(58) Field of Classification Search
CPC .............................. H04W 88/08; H04M 19/04
USPC ................ 455/550.1, 575.1, 556.1, 574, 90.1
See application file for complete search history.

(56) References Cited

U.S. PATENT DOCUMENTS

| | | | | |
|---|---|---|---|---|
| 5,946,616 | A * | 8/1999 | Schornack et al. | 455/426.1 |
| 6,115,604 | A * | 9/2000 | Lester et al. | 455/422.1 |
| 6,704,580 | B1 * | 3/2004 | Fintel | 455/550.1 |
| 6,766,175 | B2 * | 7/2004 | Uchiyama | 455/462 |
| 6,778,824 | B2 * | 8/2004 | Wonak et al. | 455/426.2 |
| 6,788,953 | B1 * | 9/2004 | Cheah et al. | 455/550.1 |
| 6,804,536 | B1 * | 10/2004 | Bultman | 455/557 |
| 6,950,674 | B2 * | 9/2005 | Jarrett | 455/552.1 |
| 6,987,988 | B2 * | 1/2006 | Uchiyama | 455/557 |
| 7,493,146 | B1 * | 2/2009 | Delker et al. | 455/567 |
| 7,515,937 | B2 * | 4/2009 | Lee | 455/557 |
| 8,064,594 | B2 * | 11/2011 | Mohan et al. | 379/413.03 |
| 8,879,430 | B2 * | 11/2014 | Goodman et al. | 370/259 |
| 2001/0031645 | A1 * | 10/2001 | Jarrett | 455/552 |
| 2002/0072390 | A1 * | 6/2002 | Uchiyama | 455/557 |
| 2004/0092295 | A1 * | 5/2004 | Yamada | 455/567 |
| 2005/0003823 | A1 * | 1/2005 | Kim et al. | 455/446 |
| 2005/0025308 | A1 * | 2/2005 | Tischer et al. | 379/413.02 |
| 2005/0070271 | A1 * | 3/2005 | Lie et al. | 455/426.2 |
| 2007/0105548 | A1 * | 5/2007 | Mohan et al. | 455/426.1 |
| 2009/0175434 | A1 * | 7/2009 | Becker | 379/220.01 |

* cited by examiner

Primary Examiner — Tilahun B Gesesse

(57) ABSTRACT

A docking station includes a first docking port configured to physically dock with a first mobile device, wherein the first docking port includes a Universal Serial Bus (USB) port. The docking station includes a subscriber line interface connected to one or more Plain Old Telephone Service (POTS) phones. The docking station further includes a switch configured to: receive a first call via the first mobile device docked in the docking station, and route the first call to the subscriber line interface, wherein the subscriber line interface rings the one or more Plain Old Telephone Service (POTS) with a first ringtone specific to the first mobile device. The first mobile device comprises a portable digital computing device that includes the capability to communicate via a mobile carrier network or via other network connections.

23 Claims, 27 Drawing Sheets

MOBILE PHONE DOCKING STATION MULTI-NETWORK TELEPHONY HUB

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTN) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a docking station permits one or more mobile devices to be docked with the docking station, and enables multi-network telephony and data communication via the docking station. The docking station includes connections to the Public Switched Telephone Network, to one or more mobile carrier networks, and to a public IP network (e.g., via a broadband access network). The docking station additionally includes connections to one or more cordless phones, one or more Plain Old Telephone System phones, a TV or a monitor, and/or client devices. The one or more cordless phones, the one or more Plain Old Telephone System phones, the TV or the monitor, and the client devices may communicate via selected ones of the Public Switched Telephone Network, the one or more mobile carrier networks, and the public IP network based on configuration settings of the docking station, or based on a selection of the user of the docking station. In one implementation, calls received at the docking station may ring with ringtones specific to the call source. For example, a call received from the Public Switched Telephone Network may ring at the docking station with a ringtone that is different than a call originated from a mobile carrier network and received via a docked mobile device. The docking station described herein, therefore, acts as a telephony and data hub that permits calls and data communication to/from multiple different types of networks via multiple different types of devices interconnected with the docking station.

Figure 1A:
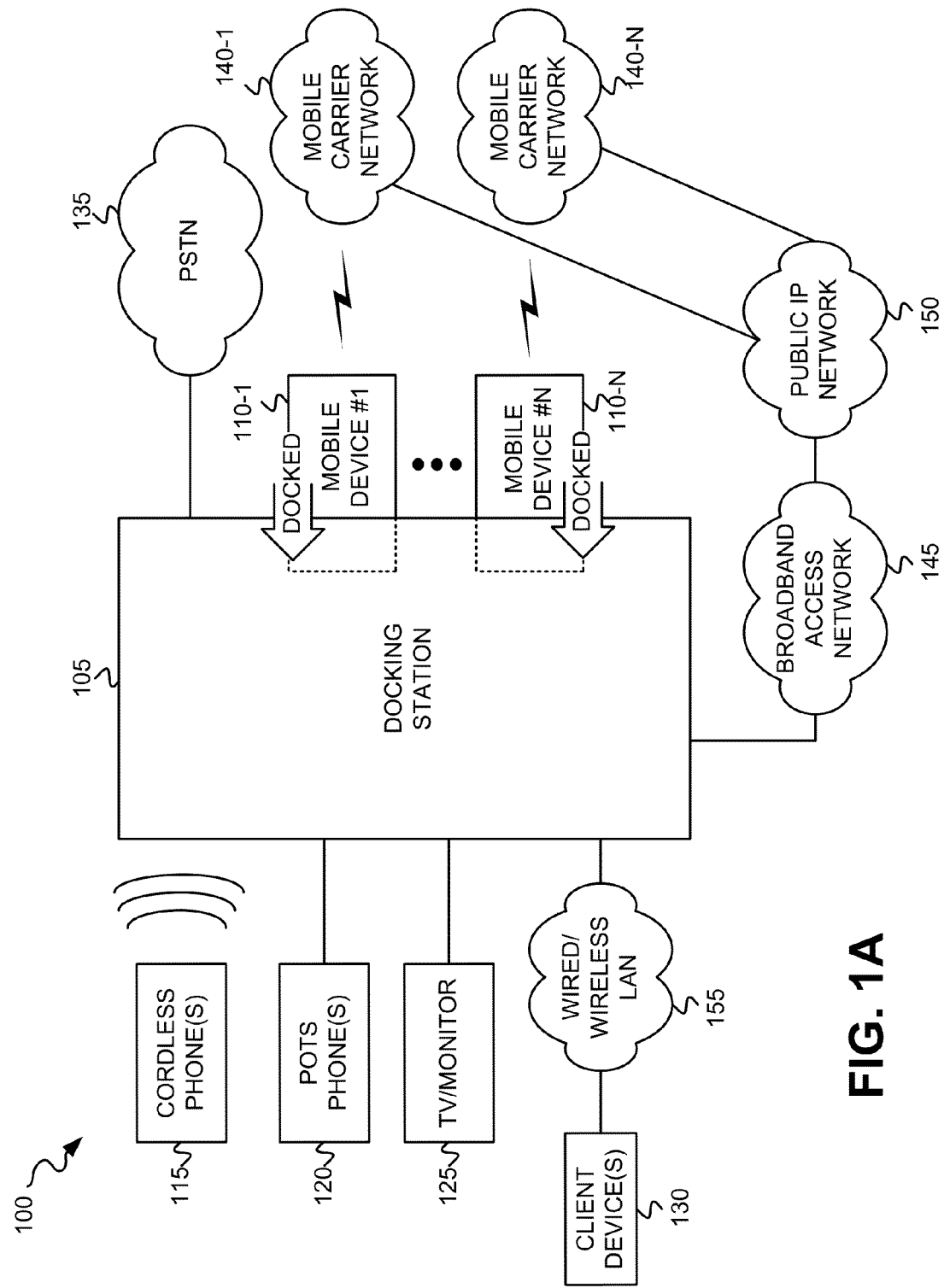
FIG. 1A is a diagram that depicts an exemplary network environment in which a mobile device docking station facilitates a telephony and data service hub for communicating via multiple different networks.

FIG. 1A is a diagram that depicts an exemplary network environment 100 in which a docking station 105, that includes mechanisms that enable one or more mobile devices to dock with docking station 105, facilitates a telephony and data service hub for communicating via multiple different networks. Network environment 100 may include docking station 105, mobile devices 110-1 through 110-N (where N is greater than or equal to one), a cordless phone(s) 115, a Plain Old Telephone Service (POTS) phone 120, a television (TV)/monitor 125, a client device(s) 130, a Public Switched Telephone Network (PSTN) 135, mobile carrier networks 140-1 through 140-N, a broadband access network 145, and a public Internet Protocol (IP) network 150. Mobile devices 110-1 through 110-N may be generically and individually referred to herein as "mobile device 110." Mobile carrier networks 140-1 through 140-N may be generically and individually referred to herein as "mobile carrier network 140."

Docking station 105 includes a telephone that has multiple different network connections (e.g., PSTN, wired/wireless LAN, broadband access network) and which also has one or more docking ports which permit mobile device 110 to be "docked" with docking station 105. Docking station 105 further includes multiple different interfaces (described with respect to FIG. 1B below) for interfacing with cordless phone(s) 115, POTS phone(s) 120, TV/monitor 125, and client device(s) 130 that can be interconnected with docking station 105.

Docking station 105 may, in some implementations, register for telephone calls on behalf of docked mobile devices 110-1 through 110-N (generically and individually referred to herein as "mobile device 110"), or act as an Internet Protocol (IP) network access point for docked mobile devices 110-1 through 110-N to receive calls. Docking station 105 may also, in some implementations, securely access authentication credentials of each docked mobile device 110 and "tunnel" those credentials to a respective mobile carrier network 140. For example, in a Fourth Generation (4G) mobile carrier network, docking station 105 may securely "read" the authentication credentials stored in mobile device 110's Subscriber Identity Module (SIM) and tunnel the authentication credentials as part of the Authentication and Key Agreement (AKA) protocol to mobile carrier network 140.

Mobile devices 110-1 through 110-N each include, for example, a cellular telephone (e.g., a smart phone), a tablet computer, a personal digital assistant (PDA), or other type of portable digital computing device that has the capability to communicate via a mobile carrier network, and possibly via other network connections (e.g., WiFi, etc.). Mobile devices 110-1 through 110-N may each be docked or undocked from docking station 105. The process of docking mobile device 110 in docking station 105 includes physically inserting mobile device 110 into a docking port of docking station 105 to establish an electrical connection between, for example, a Universal Serial Bus (USB) port in docking station 105 and a corresponding connection on docked mobile device 110. The process of undocking mobile device 110 includes physically removing mobile device 110 from the docking port of docking station 105 to break the electrical connection between the USB port in docking station 105 and a corresponding connection on docked mobile device 110.

Cordless phone(s) 115 includes a telephone that has a wireless handset that permits communication with an external base station, or an internal base station within docking station 105, connected to a fixed telephone line (e.g., telephone line of PSTN 135). Cordless phone(s) 115 includes a cordless telephone that may use Personal Handy-Phone System (PHS), Digital Enhanced Cordless Telecommunications (DECT), Wi-Fi (e.g., IEEE 802.11 standard), or BlueTooth for wireless communication with the external base station, or the base station internal to docking station 105. POTS phone(s) 120 includes a standard voice-grade telephony device that permits full duplex communication. TV/monitor 125 includes a television or a monitor (e.g., a HDTV, a display, etc.) that connects to docking station 105. In some implementations, TV/monitor 125 may include a video telephony device that communicates using video telephony via docking station 105.

Client device(s) 130 includes any type of device that may communicate via wired/wireless LAN 155. Client device(s) 130 may include, for example, a computer (e.g., desktop, laptop, palmtop, or tablet computer), computer peripherals (e.g., printers, scanners, copiers, cameras, etc.), or other types of client devices. Client device(s) 130 may connect to docking station 105 via wired or wireless local area network (LAN) 155. Wired LAN 155 may, for example, use the IEEE 802.3 wired Ethernet standard. Wireless LAN 155 may, for example, use the IEEE 802.11 wireless Ethernet standard (e.g., Wi-Fi). PSTN 135 may include any type of existing circuit-switched telephone network. Client device(s) 130 may, for example, include a VoIP application (e.g., Session Initiation Protocol (SIP)) user agent) that may send/receive VoIP calls via docking station 105.

Mobile carrier networks 140-1 through 140-N may each include a wireless public land mobile network (PLMN) (e.g., a Code Division Multiple Access (CDMA) 2000 PLMN, a Global System for Mobile Communications (GSM) PLMN, a Long Term Evolution (LTE) PLMN (e.g., Voice over LTE (VoLTE)) and/or other types of PLMNs) that may include a packet-switched network, such as, for example, a General Packet Radio Service (GPRS), a Cellular Digital Packet Data (CDPD), or a Mobile IP network. Mobile carrier networks 140-1 through 140-N may include a same PLMN, or a different PLMN.

Broadband access network 145 includes any type of network that provides a high data rate connection to public IP network 150. Broadband access network 145 may include, for example, a digital subscriber line (DSL) network, an Integrated Services Digital Network (ISDN), a satellite broadband network, or a cable Internet access network. Public IP network 150 may include, for example, the Internet.

As shown in FIG. 1A, mobile devices 110-1 through 110-N may dock with docking station 105 and thereby enable docking station 105 to connect to mobile carrier networks 140-1 through 140-N via wireless transceivers of docked mobile devices 110-1 through 110-N. "Docking" of each of mobile devices 110-1 through 110-N with docking station 105 includes a physical and electrical coupling of mobile devices 110-1 through 110-N. Each of mobile carrier networks 140-1 through 140-N may, as shown in FIG. 1A, also connect to public IP network 150.

Figure 1B:
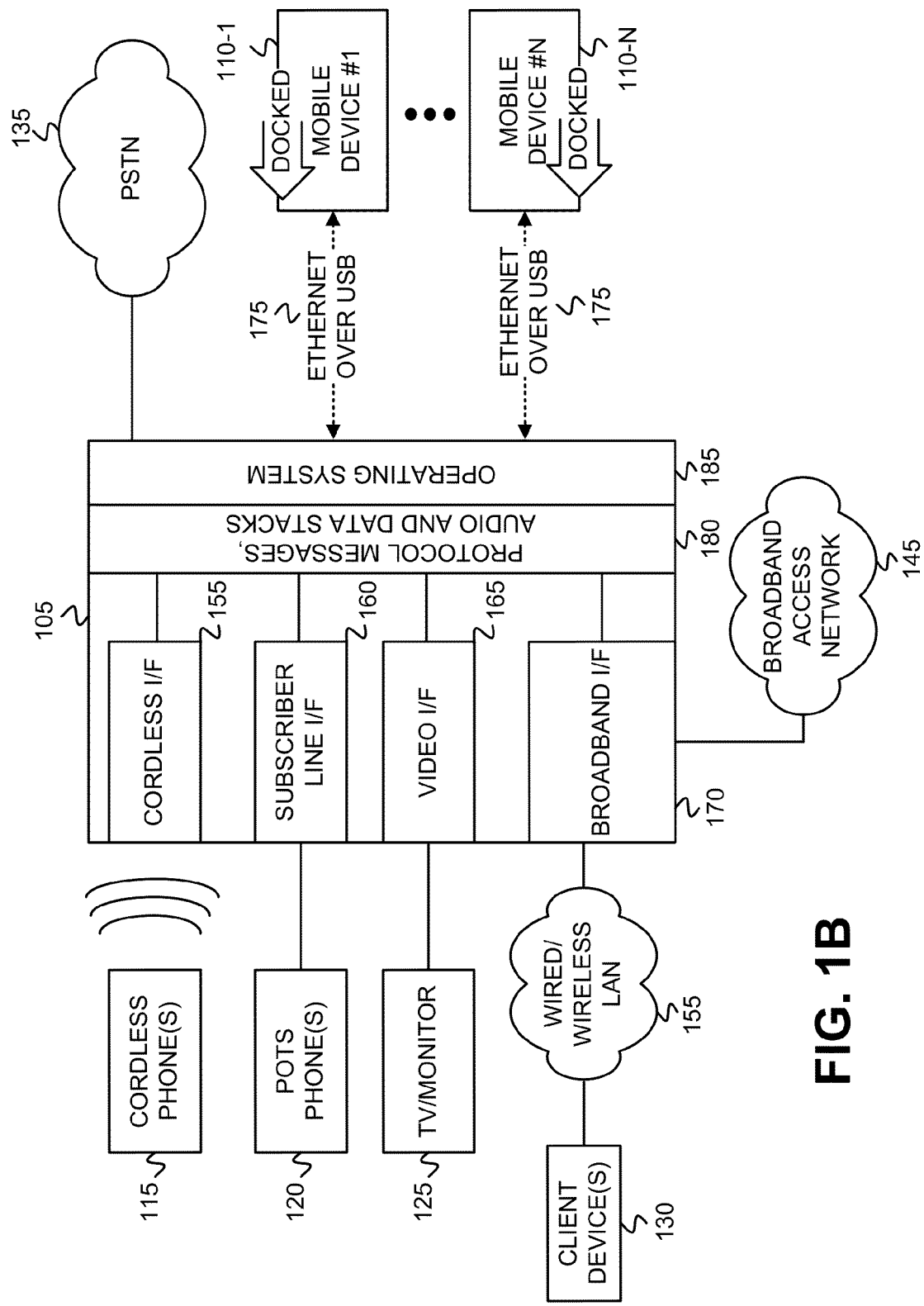
FIG. 1B depicts multiple different interfaces included within the docking station of FIG. 1A such that the docking station may operate as a telephony and data service hub via multiple different networks.

FIG. 1B is a diagram that depicts multiple different interfaces included within docking station 105, such that docking station 105 may operate as a telephony and data delivery hub via multiple different networks. As shown in FIG. 1B, docking station 105 includes a cordless Interface (I/F) 155, a subscriber line I/F 160, a video I/F 165, a broadband I/F 170, protocol messages and audio and data stacks 180, and an operating system 185.

Cordless I/F 155 includes a wireless interface that permits wireless communication between cordless phone(s) 115 and docking station 105. Cordless I/F 155 may include, for example, a DECT, WiFi, Bluetooth, or other type of wireless I/F. Subscriber line I/F 160 includes a "central office side" loop-start telephony interface that may connect to PSTN 135 via a RJ11-to-twisted-wire connection. Subscriber line I/F 160 supports a message and audio protocol between docking station 105 and cordless phone(s) 115. Video I/F 165 may convert received video data to a format usable by TV/monitor 125 (e.g., to Video Graphics Array (VGA)) format, HDTV format, or other video format). Video I/F 165 may, for example, include a High-Definition Multimedia Interface (HDMI).

Broadband I/F 170 may interface with wired/wireless LAN 155 and broadband access network 145. I/F 170 may use, for example, IEEE 802.3, IEEE 803.11, or other protocols. Protocol messages and audio and data stacks 180 may implement the mediation between the wireless signaling protocol messages and the voice/media over mobile carrier networks 140-1 through 140-N and an appropriate interface within docking station 105 (e.g., cordless I/F 155, subscriber line I/F 160, video I/F 165, broadband I/F 170). Operating system 185 includes a set of programs that manage hardware of docking station 105 and provide common services for application software and interfaces 155, 160, 165 and 170. As shown in FIG. 1B, each docked mobile device 110-1 through 110-N may communicate with docking station 105 via Ethernet over Universal Serial Bus (USB) 175, which is described in further detail below. Each docked mobile device 110-1 through 110-N may communicate with docking station 105 via other protocols, such as, for example, Serial Line Internet Protocol (SLIP).

FIGS. 2-5 are diagrams that depict the use of docking station 105 as a multi-network hub that enables cordless phone(s) 115, POTS phone(s) 120, TV/monitor 125 and client device(s) 130 to communicate via PSTN 135, mobile carrier networks 140-1 through 140-N, broadband access network 145, and public IP network 150.

Figure 2:
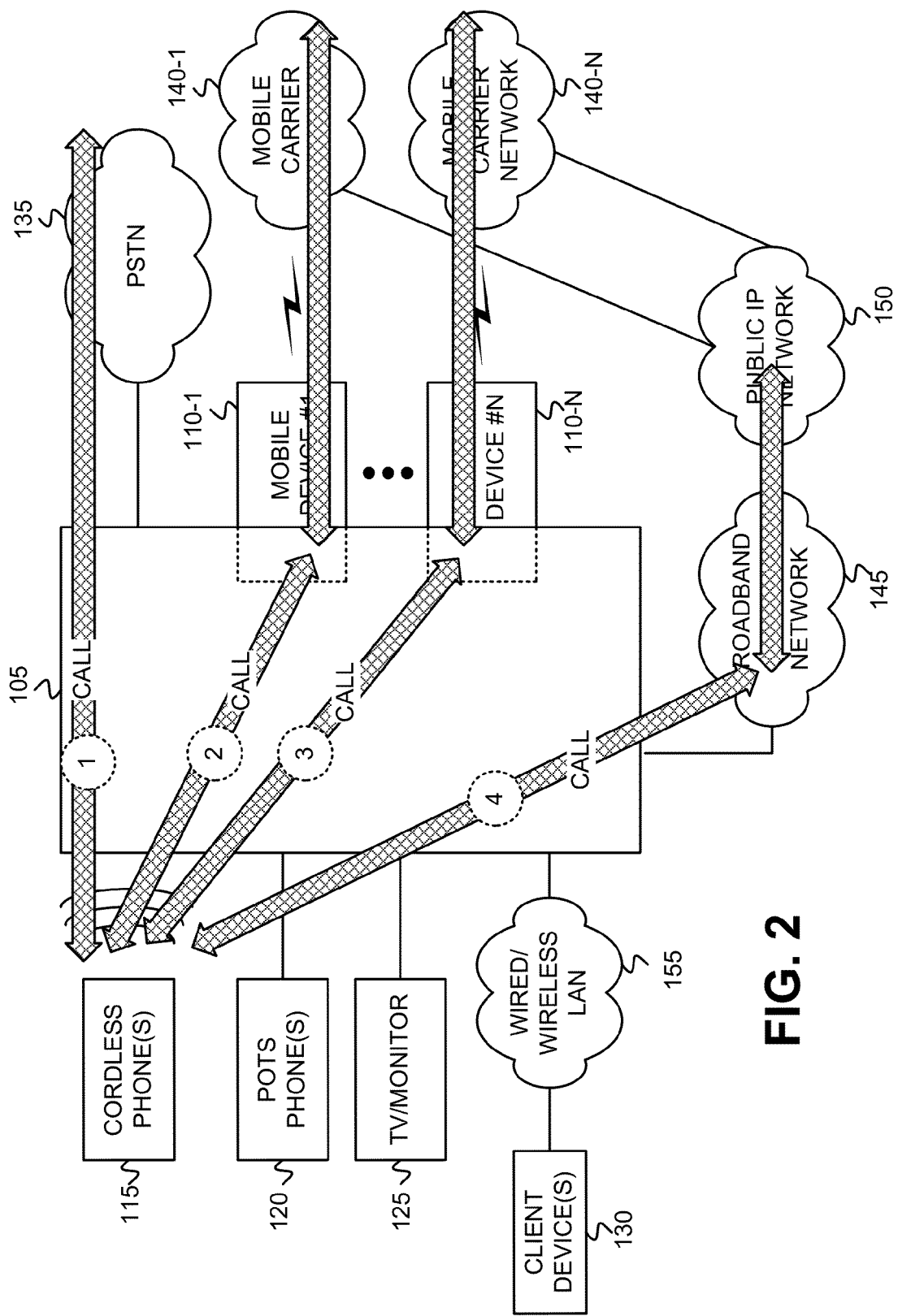
FIG. 2 illustrates voice calls made to/from the cordless phone(s) via the docking station of FIG. 1A.

FIG. 2 illustrates voice calls made to/from cordless phone(s) 115 via docking station 105. As shown by a "1" in FIG. 2, cordless phone(s) 115 may engage in a call via PSTN 135. Cordless I/F 155 (not shown in FIG. 2) may facilitate calls via a connection with PSTN 135. As further shown by a "2" in FIG. 2, cordless phone(s) 115 may engage in a call via mobile device 110-1 and mobile carrier network 140-1. Cordless I/F 155, in conjunction with protocol messages 180 and operating system 185 (not shown in FIG. 2), may facilitate calls with mobile carrier network 140-1 via mobile device 110-1. As also shown by a "3" in FIG. 2, cordless phone(s) 115 may engage in a call via mobile device 110-N and mobile carrier network 140-N. The calls via mobile carrier networks 140-1 through 140-N may additionally connect through public IP network 150. For example, calls from cordless phone(s) 115 may be made as VoIP calls and connect to their respective destinations via, for example, mobile device 110-1, mobile carrier network 140-1 and public IP network 150; or via mobile device 110-N, mobile carrier network 140-N and public IP network 150. Cordless I/F 155, in conjunction with protocol messages 180 and operating system 185, may facilitate calls with mobile carrier network 140-N via mobile device 110-N. As additionally shown by a "4" in FIG. 2, cordless phone(s) 115 may engage in a call (e.g., a VoIP call) via broadband access network 145 and public IP network 150. Cordless I/F 155, in conjunction with protocol messages 180, operating system 185, and broadband I/F 170 (not shown in FIG. 2), may facilitate calls (e.g., VoIP calls) via broadband access network 145.

When a call is incoming from PSTN 135, mobile carrier networks 140-1 through 140-N, or broadband access network 145, cordless phone(s) 115 (and docking station 105, which has an integral telephone) may ring with a different ring tone that provides an indication of the origin of the call. For example, an incoming call from PSTN 135 may have a different and distinctive ringtone at cordless phone(s) 115 and docking station 105 than an incoming call from broadband access network 145. As another example, an incoming call from mobile carrier network 140-1 (e.g., via mobile device 110-1) may have a different and distinctive ringtone at cordless phone(s) 115 than an incoming call from mobile carrier network 140-N (e.g., via mobile device 110-N).

Figure 3:
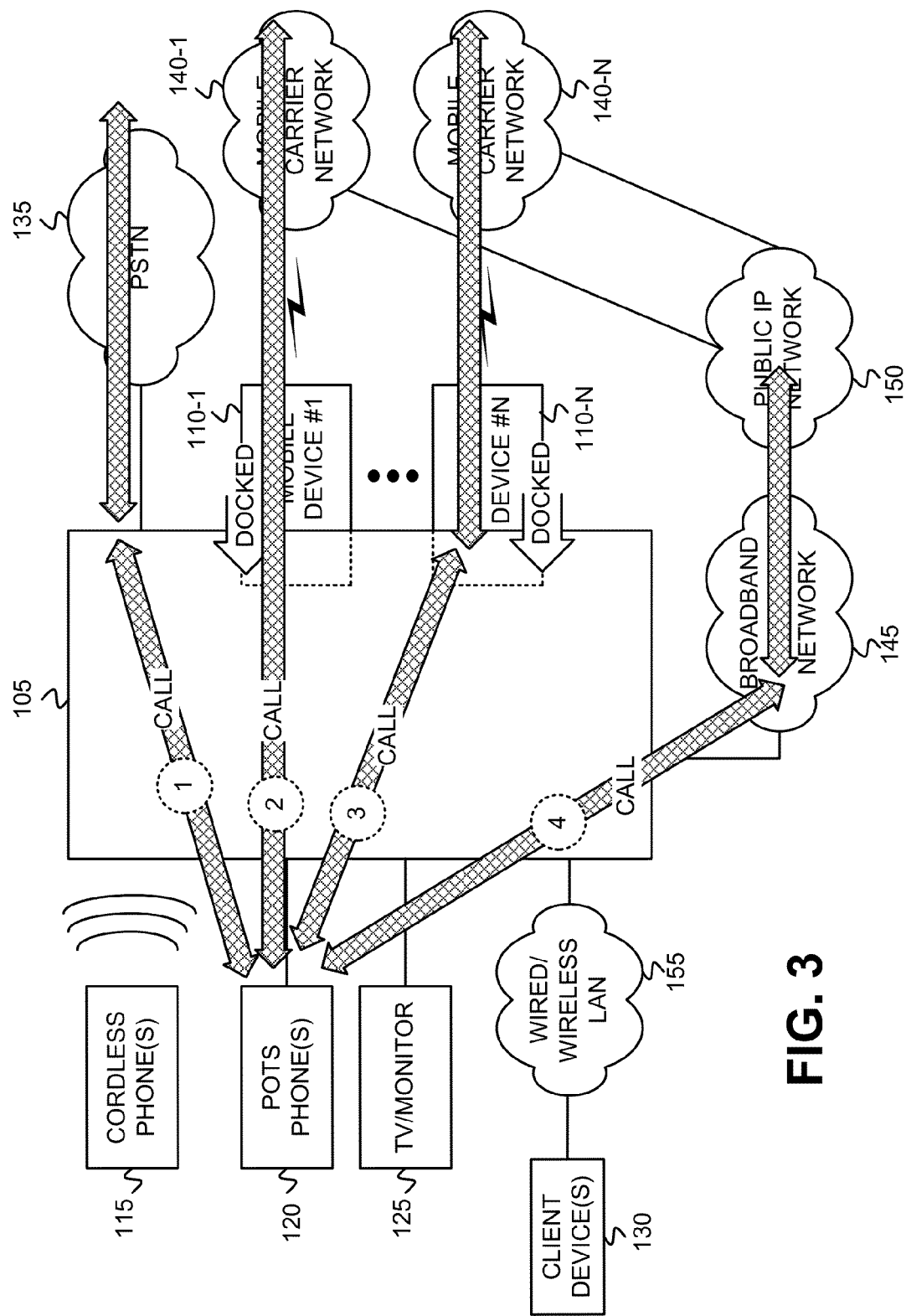
FIG. 3 illustrates voice calls made to/from the Plain Old Telephone System phone(s) via the docking station.

FIG. 3 illustrates voice calls made to/from POTS phone(s) 120 via docking station 105. As shown by a "1" in FIG. 3, POTS phone(s) 120 may engage in a call via PSTN 135. Subscriber line I/F 160 (not shown in FIG. 3) may facilitate calls via a connection with PSTN 135. As further shown by a "2" in FIG. 3, POTS phone(s) 120 may engage in a call via mobile device 110-1 and mobile carrier network 140-1. Subscriber line I/F 160, in conjunction with protocol messages 180 and operating system 185 (not shown in FIG. 3), may facilitate calls via mobile device 110-1 and mobile carrier network 140-1. As also shown by a "3" in FIG. 3, POTS phone(s) 120 may engage in a call via mobile device 110-N and mobile carrier network 140-N. The calls via mobile carrier networks 140-1 through 140-N may additionally connect through public IP network 150. For example, calls from POTS phone(s) 120 may be made as VoIP calls and connect to their respective destinations via, for example, mobile device 110-1, mobile carrier network 140-1 and public IP network 150; or via mobile device 110-N, mobile carrier network 140-N and public IP network 150. Subscriber line I/F 160, in conjunction with protocol messages 180 and operating system 185, may facilitate calls via mobile device 110-N and mobile carrier network 140-N. As additionally shown by a "4" in FIG. 3, POTS phone(s) 120 may engage in a call (e.g., a VoIP call) via broadband access network 145 and public IP network 150. Subscriber line I/F 160, in conjunction with protocol messages 180, operating system 185, and broadband I/F 170 (not shown in FIG. 3), may facilitate calls (e.g., VoIP calls) via broadband access network 145.

When a call is incoming from PSTN 135, mobile carrier networks 140-1 through 140-N, or broadband access network 145, POTS phone(s) 120 (and docking station 105), may ring with a different ring tone that provides an indication of the origin of the call. For example, an incoming call from PSTN 135 may have a different and distinctive ringtone at POTS phone(s) 120 and docking station 105 than an incoming call from broadband access network 145. As another example, an incoming call from mobile carrier network 140-1 (e.g., via mobile device 110-1) may have a different and distinctive ringtone at POTS phone(s) 120 than an incoming call from mobile carrier network 140-N (e.g., via mobile device 110-N).

Figure 4:
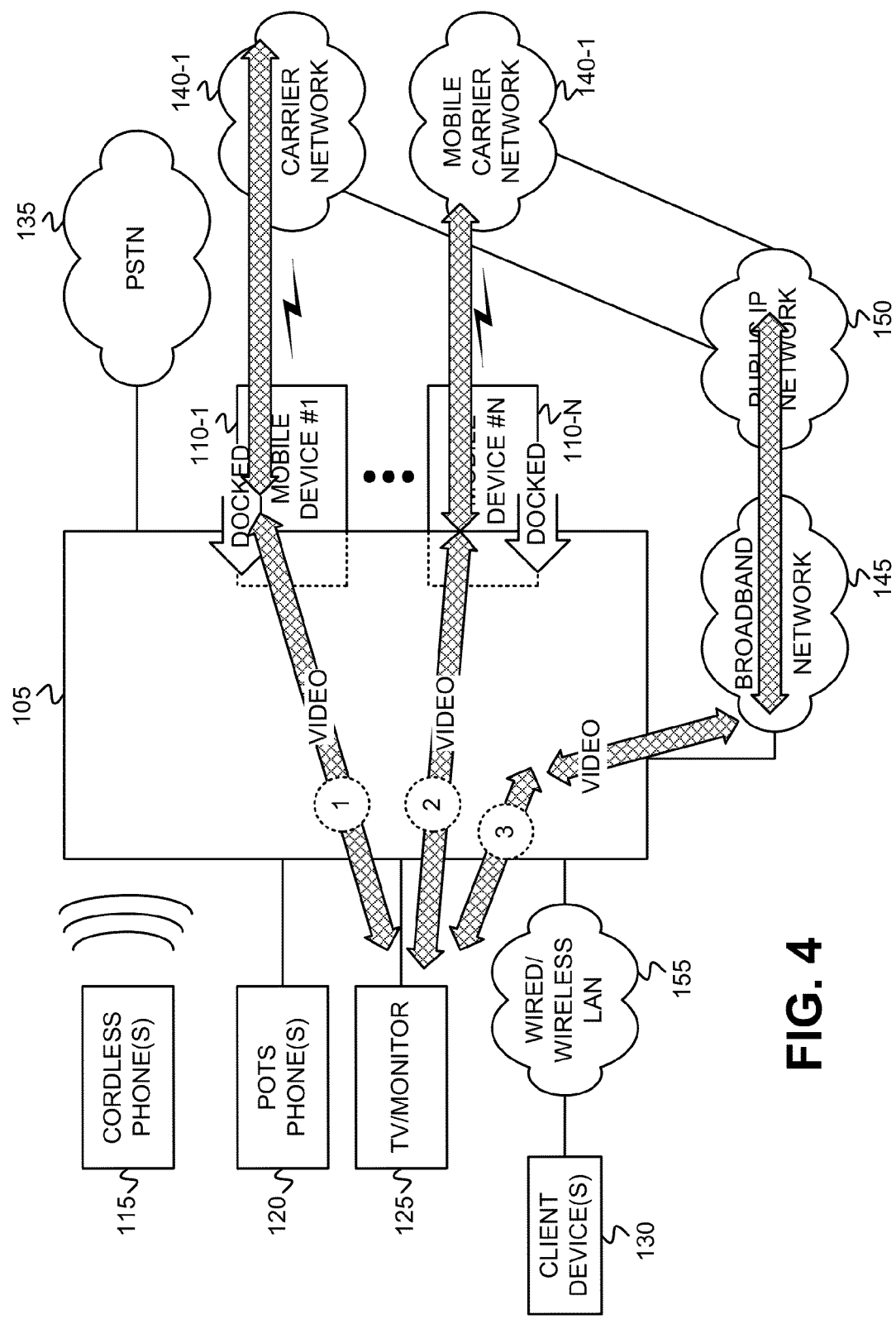
FIG. 4 illustrates the communication of video data, and video-related data, to/from the TV/monitor via the mobile carrier networks and the broadband access network of FIG. 1A.

FIG. 4 is a diagram that illustrates the communication of video data, and video-related data, to/from TV/monitor 125 via mobile carrier networks 140-1 through 140-N and broadband access network 145. If TV/monitor 125 includes a video telephony device, the video data, or video-related data, may be associated with a video telephony call connected to a video telephony source/destination (not shown). The video data, or video-related data, may, therefore, be associated with one-way broadcast video, or with two-way video telephony. As shown by a "1" in FIG. 4, TV/monitor 125 may receive video data, and send video-related data, via mobile device 110-1 and mobile carrier network 140-1. Video I/F 165 (not shown in FIG. 4) may receive video data from mobile device 110-1 (via mobile carrier network 140-1) and may format the video data to a format compatible with TV/monitor 125. Video I/F 165 may receive video-related data from TV/monitor 125 (e.g., control data received from a remote control device) and may forward the video-related data towards a destination via mobile device 110-1 and mobile carrier network 140-1.

As further shown by a "2" in FIG. 4, TV/monitor 125 may receive video data, and send video-related data, via mobile device 110-N and mobile carrier network 140-N. Video I/F 165 may also receive video data from mobile device 110-N (via mobile carrier network 140-N) and may format the video data to a format compatible with TV/monitor 125. Video I/F 165 may receive the video-related data from TV/monitor 125 (e.g., control data received from a remote control device) and may forward the video-related data towards a destination via mobile device 110-N and mobile carrier network 140-N. As additionally shown by a "3" in FIG. 4, TV/monitor 125 may receive video data, and send video-related data, via broadband access network 145 and public IP network 150. Video I/F 165 may also receive video data via broadband access network 145 and public IP network 150 and may format the video data to a format compatible with TV/monitor 125. Video I/F 165 may receive the video-related data from TV/monitor 125 (e.g., control data received from a remote control device) and may forward the video-related data towards a destination via broadband access network 145 and public IP network 150.

Figure 5:
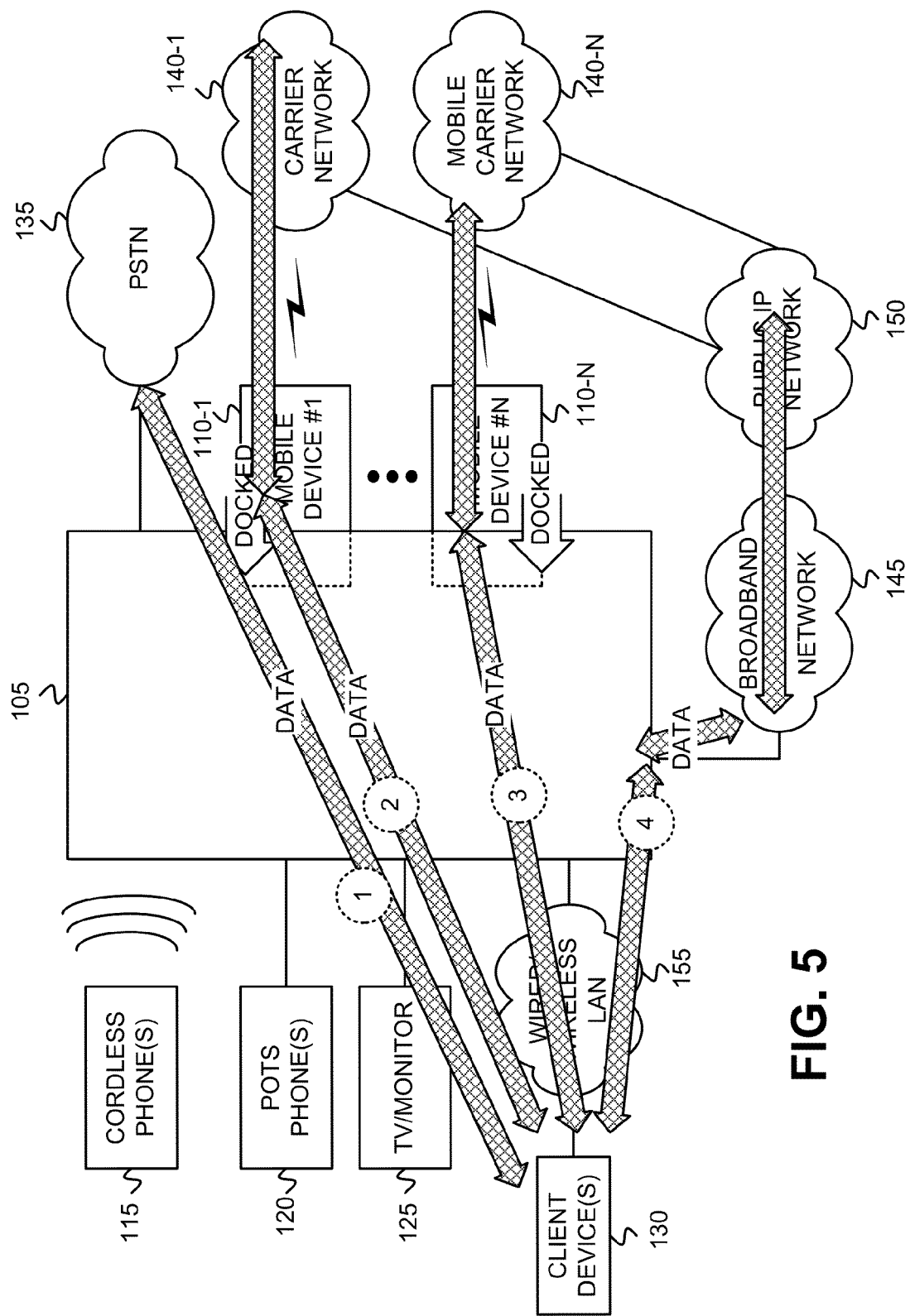
FIG. 5 illustrates the communication of data to/from the client device(s) via the mobile carrier networks and the broadband access network of FIG. 1A.

FIG. 5 is a diagram that illustrates the communication of data (e.g., packet-switched data) to/from client device(s) 130 via PSTN 135, mobile carrier networks 140-1 through 140-N and broadband access network 145. As shown by a "1" in FIG. 5, client device(s) 130 may receive data, and send data, via PSTN 135. As further shown by a "2" in FIG. 5, client device(s) 130 may receive data, and send data, via mobile device 110-1 and mobile carrier network 140-1. As further shown by a "3" in FIG. 5, client device(s) 130 may receive data, and send data, via mobile device 110-N and mobile carrier network 140-N. As additionally shown by a "4" in FIG. 5, client device(s) 130 may receive data, and send data, via broadband access network 145 and public IP network 150.

Figure 6A:
FIGS. 6A and 6B depict one example of a physical configuration of the docking station, the mobile device, and a mobile device tray, and the physical interconnection of the docking station, the mobile device, and the mobile device tray.
Figure 6B:

FIGS. 6A and 6B depict one example of a physical configuration of docking station 105, mobile device 110, and a mobile device tray 600, and the physical interconnection of docking station 105, mobile device 110, and mobile device tray 600. Mobile device tray 600 may include a physical configuration that fits the external configuration of mobile device 110, such that mobile device 110 may be inserted into mobile device tray 600. In addition, mobile device 110's Universal Serial Bus (USB) port (or other connector port(s)) may interconnect with an appropriate physical and electrical port of mobile device tray 600. Subsequent to insertion of mobile device 110 into mobile device tray 600, tray 600 may be inserted into a docking port 610 of docking station 105 to complete the USB port interconnection between mobile device 110 and docking station 105. FIG. 6B depicts mobile device 110 inserted into docking port 610 of docking station 105. While docked in docking station 105, mobile device 110 may be used for controlling the operation of docking station 105. For example, if mobile device 110 has a touch panel display, then the touch panel display of mobile device 105 may be used for dialing a call, instead of using a keypad on docking station 105.

The physical configuration of docking station 105 shown in FIGS. 6A and 6B represents one exemplary implementation. Other physical configurations may be alternatively used. For example, though only one docking port 610 is shown, multiple docking ports 610 may be incorporated into docking station 105 in other implementations. As another example, docking station 105 may not include a keypad, or other user controls, and merely may be faceless with one or more docking ports 610 for docking a mobile device(s) 110.

Figure 7:
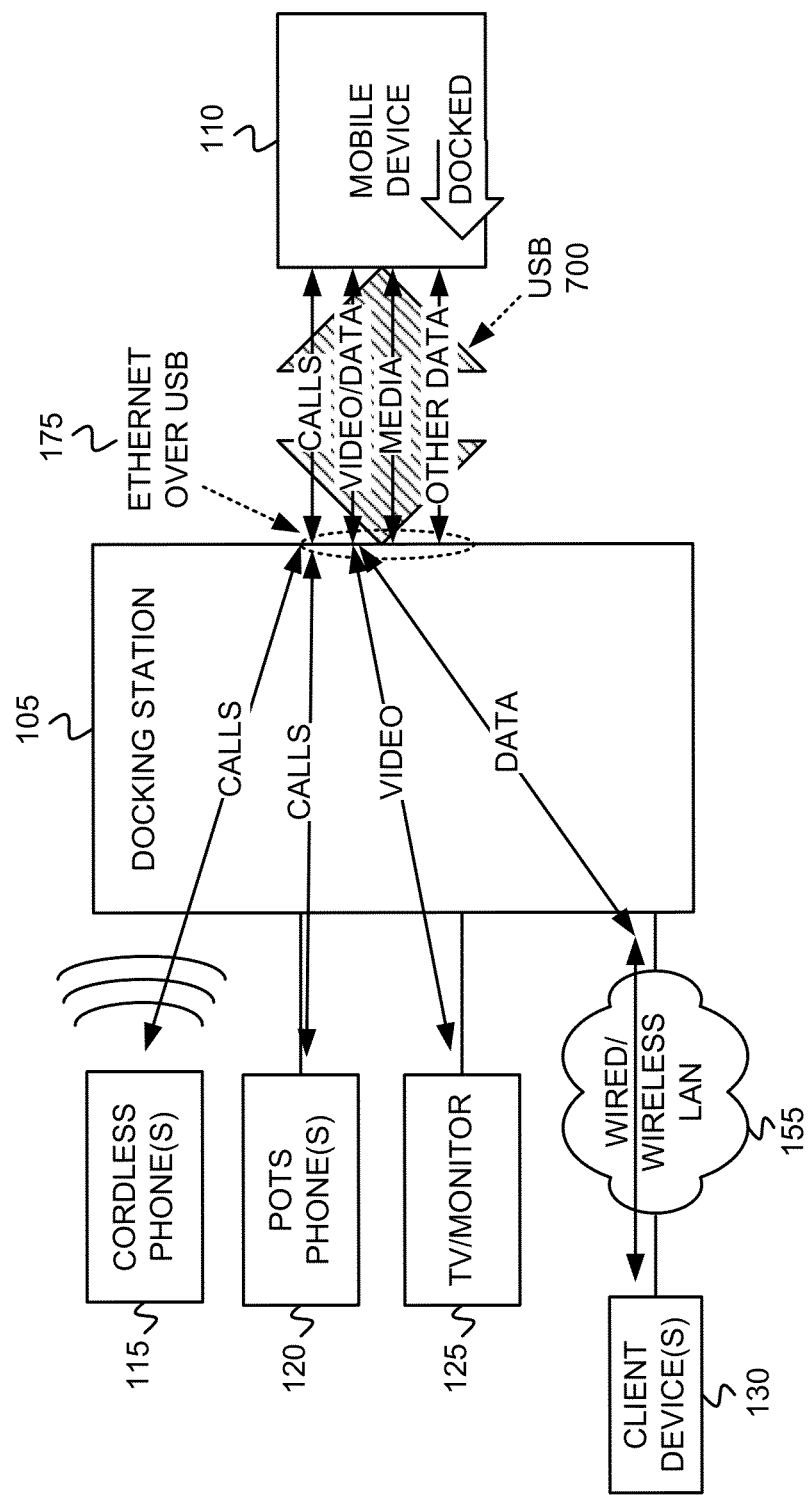
FIG. 7 depicts the communication of calls, video, and data to the cordless phone(s), the Plain Old Telephone System phone(s) 120, the TV/monitor and the client device(s) of FIG. 1A from the mobile device via the Ethernet over USB and the docking station.

FIG. 7 depicts the communication of calls, video, and data to cordless phone(s) 115, POTS phone(s) 120, TV/monitor 125 and client device(s) 130 from mobile device 110 via Ethernet over USB and docking station 105. As shown in FIG. 7, mobile device 110 may, when docked with docking station 105 (i.e., physically inserted into docking port 610), connect with a USB port 700 of docking station 105. Mobile device 110 may use Ethernet over USB 175 for exchanging media (e.g., audio or video) or "other data" with docking station 105. The exchanged media may include audio streamed from a microphone of docking station 105 to mobile device 110, or from a microphone of mobile device 110 to docking station 105. The exchanged media may further include video streamed from a camera (or memory) of docking station 105 to mobile device 110, or from a camera (or memory) of mobile device 110 to docking station 105. The "other data" may include keypad information (e.g., indications of keypad presses on docking station 105), status information (e.g., voicemail message indicator light, etc.), and other information that may be exchanged between mobile device 110 and docking station 105. The other data may further include data other than audio or video data, such as, for example, web traffic data. The transfer of the media and/or the other data may be through sockets, such as Transmission Control Protocol (TCP) or User Datagram Protocol (UDP) sockets.

Mobile device 110 may further use Ethernet over USB 175 for sending calls to/from cordless phone(s) 115 and POTS phone(s) 120 via mobile device 110 and mobile carrier network 140 (not shown). Mobile device 110 may also use Ethernet over USB 175 for sending video to TV/monitor 125 via mobile carrier network 140, and for receiving video-related data from TV/monitor 125 for communication from mobile device 110 via mobile carrier network 140 (not shown). Mobile device 110 may additionally use Ethernet over USB 175 for sending data to/from client device(s) 130 via mobile carrier network 140. Mobile device 110 may user other protocols for sending/receiving calls, video/data, media, or other data to/from docking station 105. For example, mobile device 110 may communicate with docking station 105 via USB 700 using Serial Line Internet Protocol (SLIP).

Figure 8:
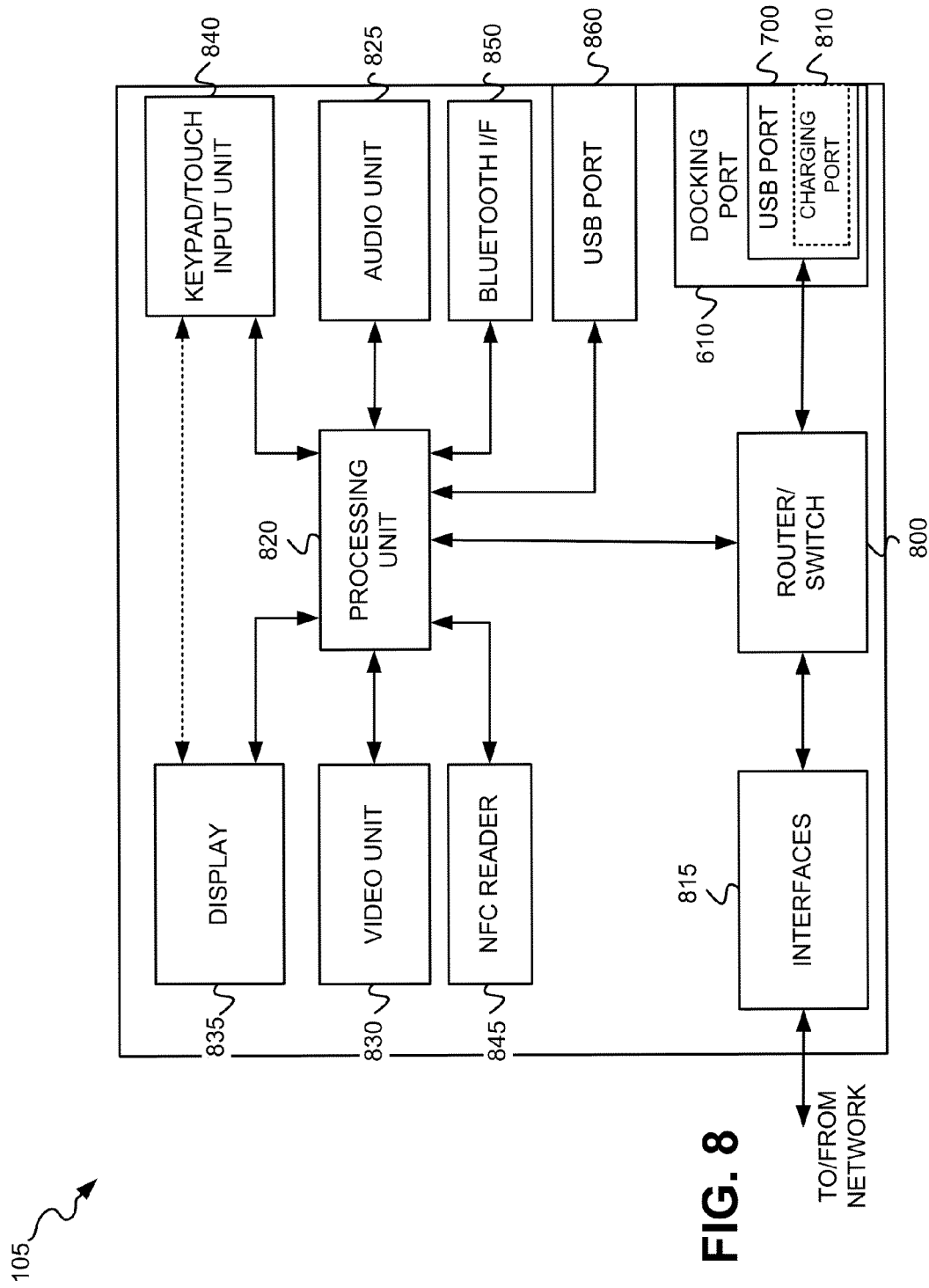
FIG. 8 is a diagram that depicts exemplary components of the docking station of FIG. 1A.

FIG. 8 is a diagram that depicts exemplary components of docking station 105. Docking station 105 may include docking port 610, a router/switch 800, interfaces 815, a processing unit 820, an audio unit 825, a video unit 830, a display 835, a keypad/touch input unit 840, a Near Field Communication (NFC) reader 845, a Bluetooth interface 850, and a USB port 860.

Docking port 610 may include a port that may physically engage with a tray into which mobile device 110 is inserted. The shape and size of docking port 610 may be different based on a different external configuration of mobile device 110. Docking port 610 may further include USB port 700, which also includes a charging port 810 (i.e., USB port 700 may simultaneously act as a data port and a battery charging port). Though a single docking port 610 is depicted in FIG. 8, docking station 105 may include multiple docking ports 610, including multiple USB ports 700 and multiple charging ports 810. Charging port 810 may include an electrical connection for supplying a charging current to a battery of mobile device 110. USB port 700 may include an electrical connection for the USB that may interconnect docking station 105 with mobile device 110.

Router/switch 800 may provide functionality similar to that of a broadband home router, such as, for example, Network Address Translation (NAT), wireless security protocol(s), port forwarding, or Domain Name System (DNS) functionality, etc. Router/switch 800 may switch/route data received from broadband access network 145, or from mobile devices 110-1 through 110-N, to client device(s) 130 (via wired/wireless LAN 155), TV/monitor 125, POTS phone(s) 115, and/or cordless phone(s) 115. Broadband I/F 170 may also route data received from cordless phone(s) 115, POTS phone(s) 120, TV/monitor 125 and client device(s) 130 to broadband access network 145 or to a selected one of mobile devices 110-1 through 110-N. Interfaces 815 may include cordless I/F 155, subscriber line I/F 160, video I/F 165 and broadband I/F 170 described above with respect to FIG. 1B.

Processing unit 820 may include a processor, microprocessor, or processing logic that may interpret and execute instructions. The instructions may be stored in memory (not shown), such as, for example, a random access memory (RAM), a Read Only Memory (ROM), or another type of dynamic or static storage device that may store information and instructions for execution by processing unit 820. Processing unit 820 may, for example, execute instructions for mediating between loop start signaling on the twisted pair wired connection between POTS phone(s) 120 and docked mobile devices 110-1 through 110-N.

Audio unit 825 may include a microphone or speakerphone for receiving audio input into docking station 105, and may include mechanisms for playback of audio data received from the microphone, or received from mobile device 110. Video unit 830 may include a camera for capturing video, and may further include mechanisms for playback of video data received from the camera, or received from mobile device 110. Display 835 may include a display device that may display video data or other types of data associated with the operation of docking station 105 or mobile device 110. In some implementations, display 830 may include a touch screen display that registers touch input at different locations upon the touch screen. Keypad/touch input unit 840 may include an alphanumeric keypad and mechanisms for receiving indications of touch input from display 830.

NFC reader 845 may include a short range, high frequency system that enables the short range (e.g., 10 centimeters) exchange of data with mobile device 110. When mobile device 110 is placed in proximity to docking station 105 (e.g., device 110 is inserted into docking port 810), NFC reader 845 may "read" device identity information from a corresponding NFC system located in device 105. In addition to device identity information, NFC reader 845 may also read device user identity information from the corresponding NFC system located in device 105. NFC reader 645 may, thus, be used to identify different mobile devices that may be placed in proximity to docking station 105. Docking station 105 may use the identity information to configure the docking station based on stored user settings. Bluetooth interface 850 may include a short wavelength system for connecting with, and exchanging data over short distances, with any type of Bluetooth enabled device. Bluetooth interface 850 may, for example, connect with a Bluetooth enabled audio headset that permits a wearer to listen to audio from audio unit 825.

The configuration of components of docking station 105 illustrated in FIG. 8 is for illustrative purposes only. Other configurations may be implemented. Therefore, docking station 105 may include additional, fewer and/or different components than those depicted in FIG. 8. For example, docking station 105 may include a system(s) for implementing an Ethernet switch (not shown in FIG. 8), and/or for implementing, or interfacing with, Virtual Local Area Networks (VLANs). Docking station 105 may further include a magnetic sensor that may detect the insertion of mobile device 110 into docking port 610 and may thereby initiate various functions at docking station 105 or at mobile device 110 (e.g., initiate execution of a VoIP application at mobile device 110, etc.).

Figure 9:
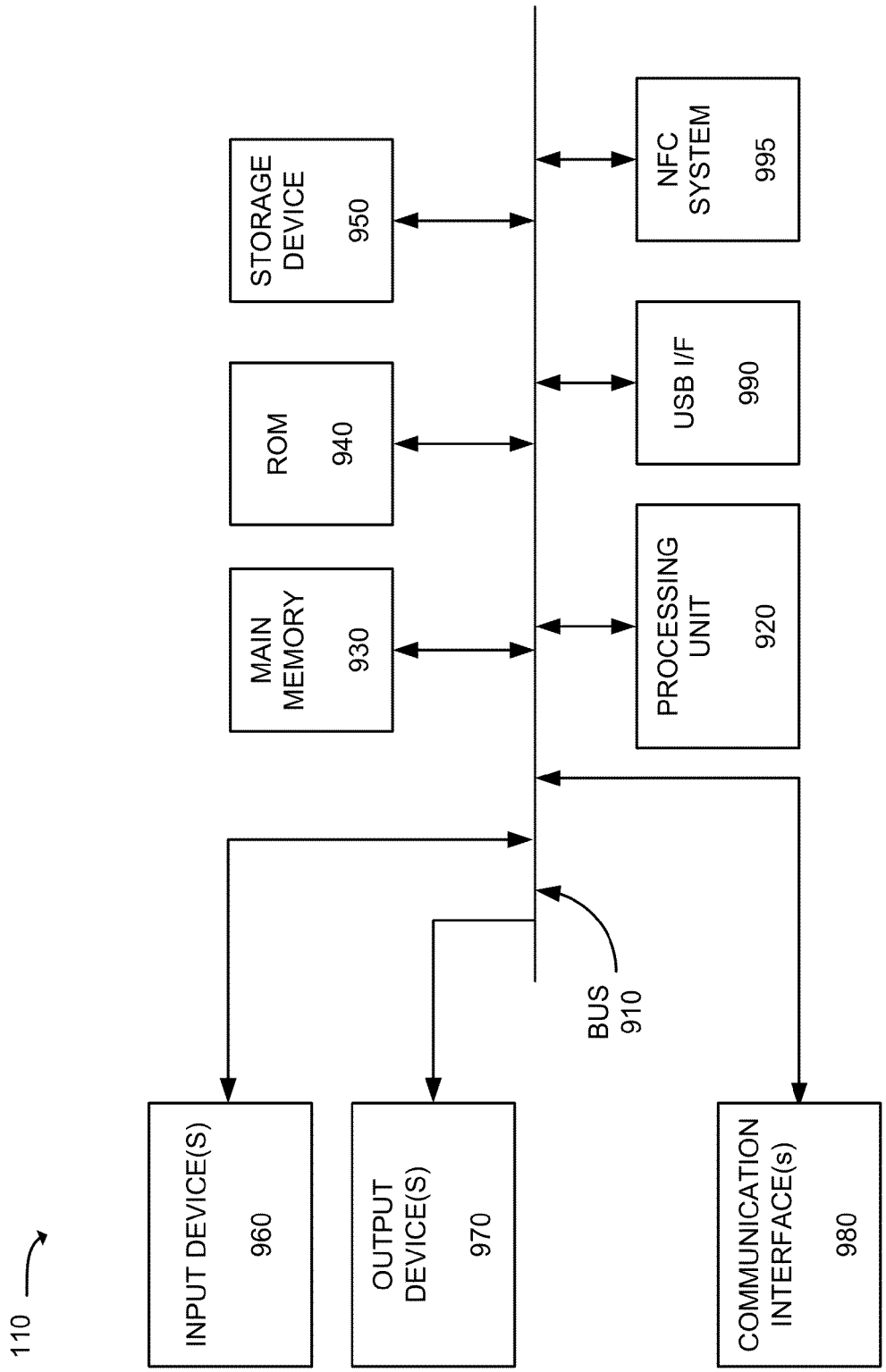
FIG. 9 is a diagram that depicts exemplary components of the mobile devices of FIG. 1A.

FIG. 9 is a diagram that depicts exemplary components of mobile device 110. Mobile device 110 may include a bus 910, a processing unit 920, a main memory 930, a read only memory (ROM) 940, a storage device 950, an input device(s) 960, an output device(s) 970, a communication interface(s) 980, a USB interface 990, and a NFC system 995. Bus 910 may include a path that permits communication among the components of mobile device 110.

Processing unit 920 may include a processor, a microprocessor, or processing logic that may interpret and execute instructions. Main memory 930 may include a random access memory (RAM) or another type of dynamic storage device that may store information and instructions for execution by processing unit 920. ROM 940 may include a ROM device or another type of static storage device that may store static information and instructions for use by processing unit 920. Storage device 950 may include a magnetic and/or optical recording medium.

Input device 960 may include one or more mechanisms that permit an operator to input information to mobile device 110, such as, for example, a keypad or a keyboard, voice recognition and/or biometric mechanisms, etc. Output device 970 may include one or more mechanisms that output information to the operator, including a display, a speaker, etc. Communication interfaces 980 may include one or more transceivers that enable mobile device 110 to communicate with other devices and/or systems. For example, communication interfaces 980 may include a radio frequency transceiver for communicating via mobile carrier network 140. Additionally, communication interfaces 980 may include another radio frequency transceiver for communication via wireless LAN 155. USB I/F 990 may include communication interface interconnection mechanisms (e.g., a USB port) to permit mobile device 110 to physically and electrically connect with USB port 700 of docking station 105. NFC system 995 may include a short range, high frequency system that enables the short range exchange of data to/from mobile device 110 to docking station 105. When mobile device 110 is placed in proximity to docking station 105 (e.g., device 110 is inserted into docking port 610), NFC system 995 may transmit device identity information and/or device user identity information that may be "read" by NFC reader 845 of docking station 105.

The configuration of components of mobile device 110 illustrated in FIG. 9 is for illustrative purposes only. Other configurations may be implemented. Therefore, mobile device 110 may include additional, fewer and/or different components than those depicted in FIG. 9. For example, mobile device 110 may include a Global Positioning System (GPS) unit that may be used for determining a location of mobile device 110.

Figure 10:
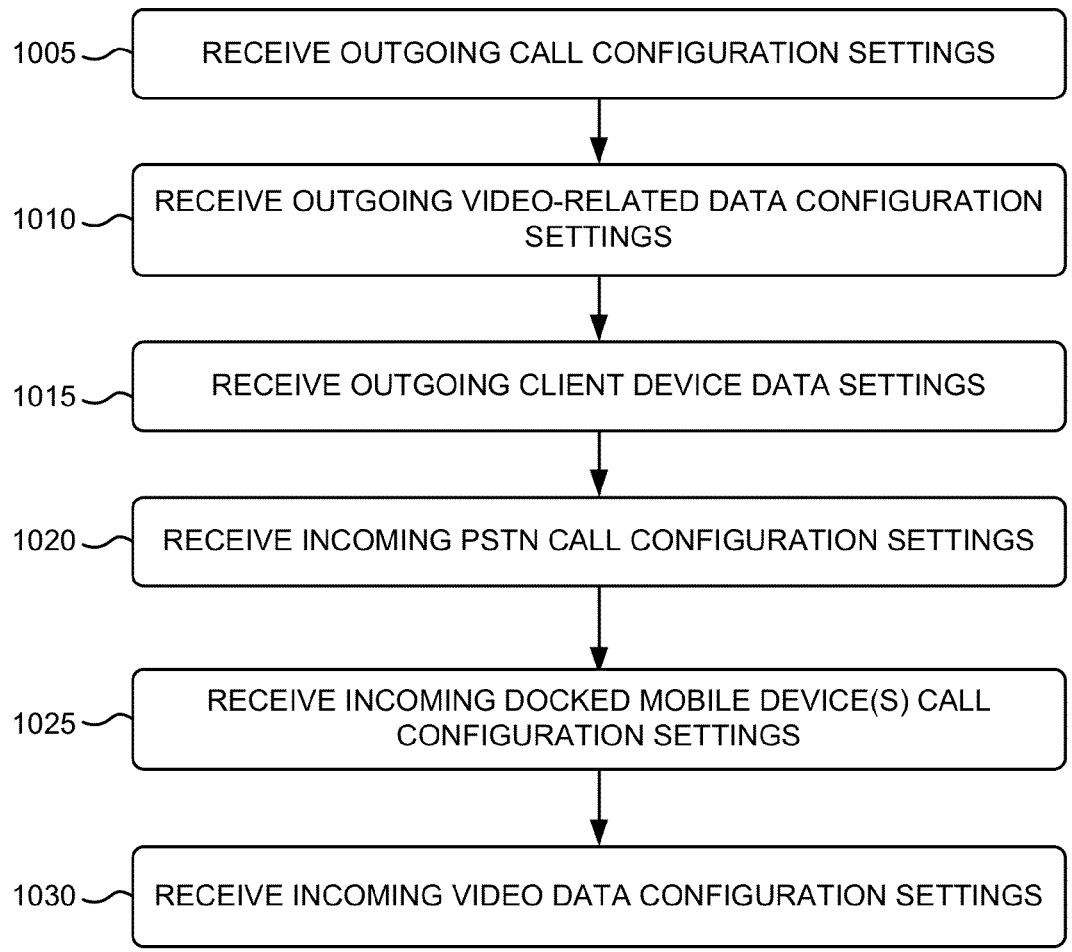
FIG. 10 is a flow diagram that illustrates an exemplary process for configuration management of the docking station of FIG. 1A.

FIG. 10 is a flow diagram that illustrates an exemplary process for configuration management of docking station 105. The exemplary process of FIG. 10 may be performed by docking station 105. The exemplary process of FIG. 10 enables either a network administrator, or a user of docking station 105, to establish configuration settings of docking station 105. Such configuration settings may include, for example, a ringtone setting that specifies a first ringtone for calls received via PSTN 135, a second ringtone for calls received via mobile device 110-1, and a third ringtone for calls received via mobile device 110-N.

The exemplary process may include receiving outgoing call configuration settings (block 1005). The outgoing call configuration settings may specify the default routing of calls originating from cordless phone(s) 115 and POTS phone(s) 120. For example, a user of docking station 105 may set the outgoing call configuration settings to specify that calls originating from cordless phone(s) 115 and POTS phone(s) 120 are to be routed as VoIP calls via broadband access network 145. As another example, a user of docking station 105 may set the outgoing call configuration settings to specify that calls originating from cordless phone(s) 115 and POTS phone(s) 120 are to be routed via a docked mobile device 110 having the highest quality connection with a mobile carrier network 140.

Docking station 105 may receive outgoing video-related data configuration settings (block 1010). The outgoing video-related data configuration settings may specify default routing associated with video-related data sent from TV/monitor 125. Docking station 105 may receive outgoing client device data settings (block 1015). The outgoing client device data settings may specify default data routing associated with data sent by client device(s) 130.

Docking station 105 may receive incoming PSTN call configuration settings (block 1020). The incoming PSTN call configuration settings may specify which of cordless phone(s) 115 and/or POTS phone(s) 120 are to receive calls from PSTN 135. The incoming PSTN call configuration settings specify the PSTN-specific ringtone to use when ringing the call through at cordless phone(s) 115 and/or POTS phone(S) 125.

Docking station 105 may receive incoming docked mobile device(s) call configuration settings (block 1025). The incoming docked mobile device(s) call configuration settings may specify which of cordless phone(s) 115 and/or POTS phone(s) 120 are to receive calls from each docked mobile device 110-1 through 110-N. The incoming docked mobile device(s) call configuration settings specify the mobile device-specific ringtone to use when ringing a given call through at cordless phone(s) 115 and/or POTS phone(S) 125.

Docking station 105 may receive incoming video data configuration settings (block 1030). The incoming video data configuration settings may specify, for example, the format the incoming video data is to be converted to when routing the video data to TV/monitor 125.

Other configuration settings of docking station 105, not described with respect to FIG. 10, may be set by the user of docking station 105. For example, the user may select the dial-tone heard at docking station 105 and cordless phone(s) 115 and POTS phone(s) 120. The user may additionally select the dial plan that applies to calls made at docking station 105, cordless phone(s) 115 and/or POTS phone(s) 120. The configuration settings described with respect to FIG. 10 are described as being specified by a user of docking station 105. However, default configuration settings may initially be set at the time of manufacture, and changes to the default settings may be received, for example, from a network administrator using a secure configuration mechanism via PSTN 135, mobile carrier networks 140-1 through 140-N, or broadband access network 145.

Figure 11A:
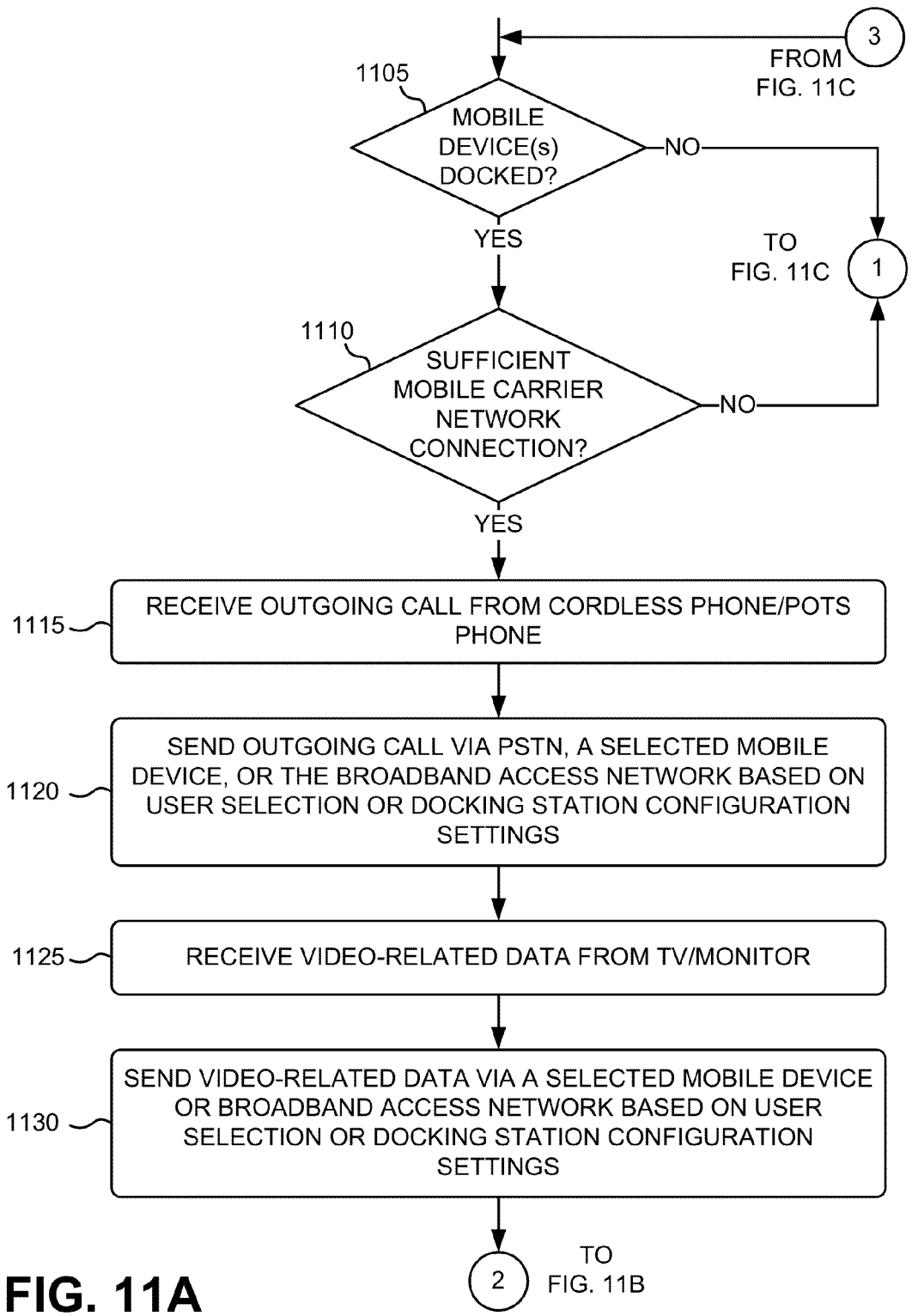
FIGS. 11A-11C are flow diagrams that illustrate an exemplary process for sending outgoing calls and data from the cordless phone(s), the Plain Old Telephone System phone(s), the TV/monitor, and the client device(s) of FIG. 1A via the docking station to the Public Switched Telephone Network (PSTN), the mobile carrier networks or the broadband access network.
Figure 11B:
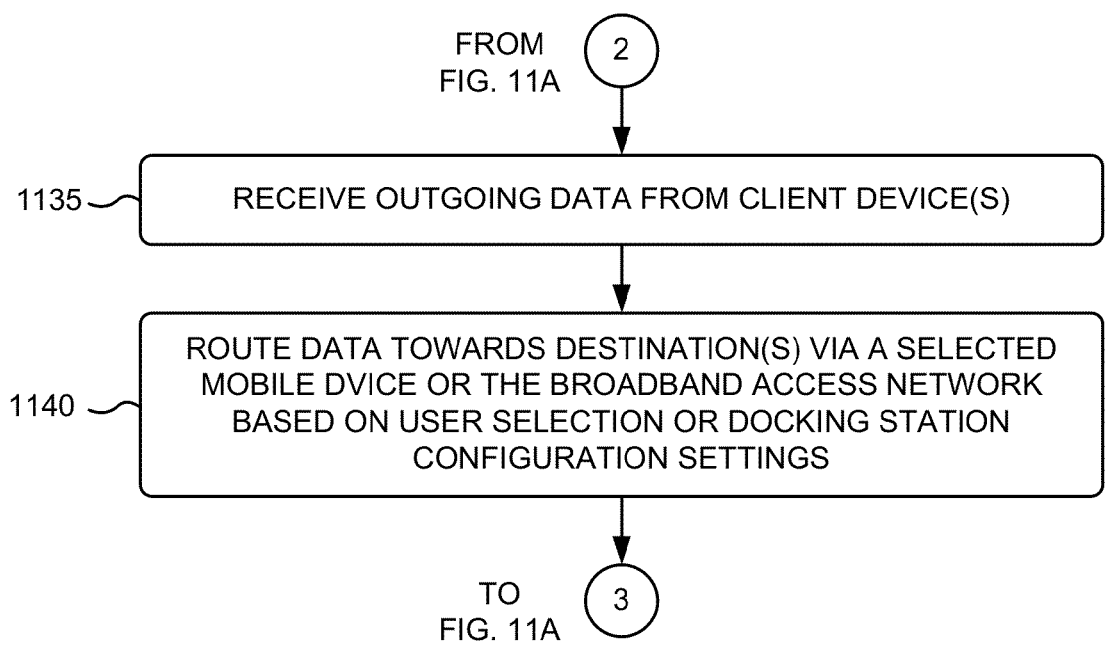
Figure 11C:
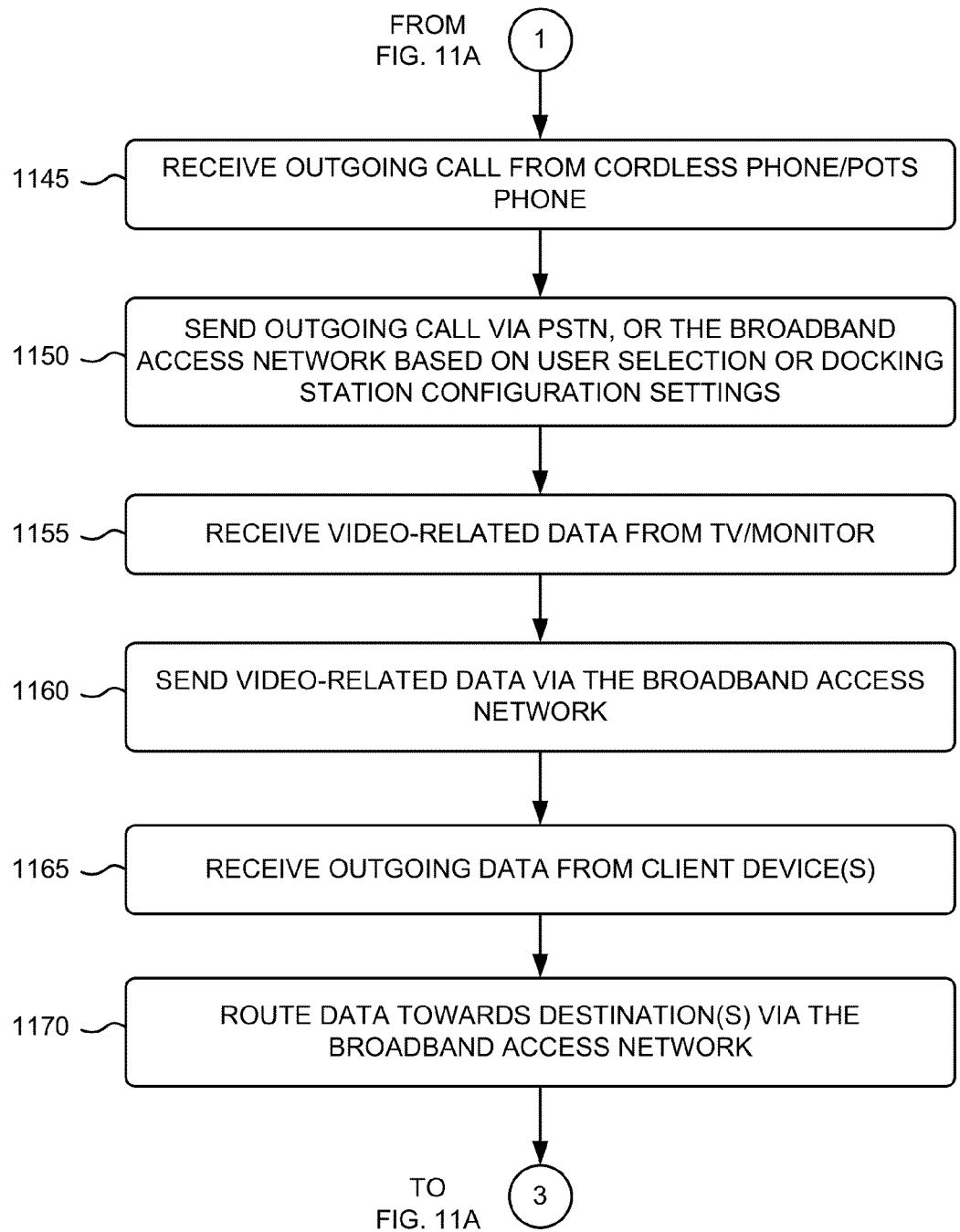

FIGS. 11A-11C are flow diagrams that illustrate an exemplary process for sending outgoing calls and data from cordless phone(s) 115, POTS phone(s) 120, TV/monitor 125, and client device(s) 130 via docking station 105 to PSTN 135, mobile carrier networks 140-1 through 140-N, or broadband access network 145. The exemplary process of FIGS. 11A-11C may be implemented by docking station 105.

Referring to FIG. 11A, the exemplary process may include determining whether a mobile device 110 has been docked into docking station 105 (block 1105). Docking station 105 may identify whether one or more mobile devices 110 have been docked in a docking port 610. If at least one mobile device 110 has been docked into docking station 110 (YES—block 1105), then docking station 105 may determine whether the docked mobile device(s) 110 has a sufficient mobile carrier network connection (block 1110). Docked mobile device 110 may have no connection to mobile carrier network 140 at all, or the signal strength or other type of signal quality of the connection may be inadequate for communicating with mobile carrier network 140. Docking station 105 may receive connection information (e.g., signal strength or quality) from docked mobile device 110.

If mobile device 110 is not docked with docking station 105 (NO—block 1105), or mobile device 110 does not have a sufficient mobile carrier network connection (NO—block 1110), then the exemplary process may continue at block 1145 in FIG. 11C.

Figure 12:
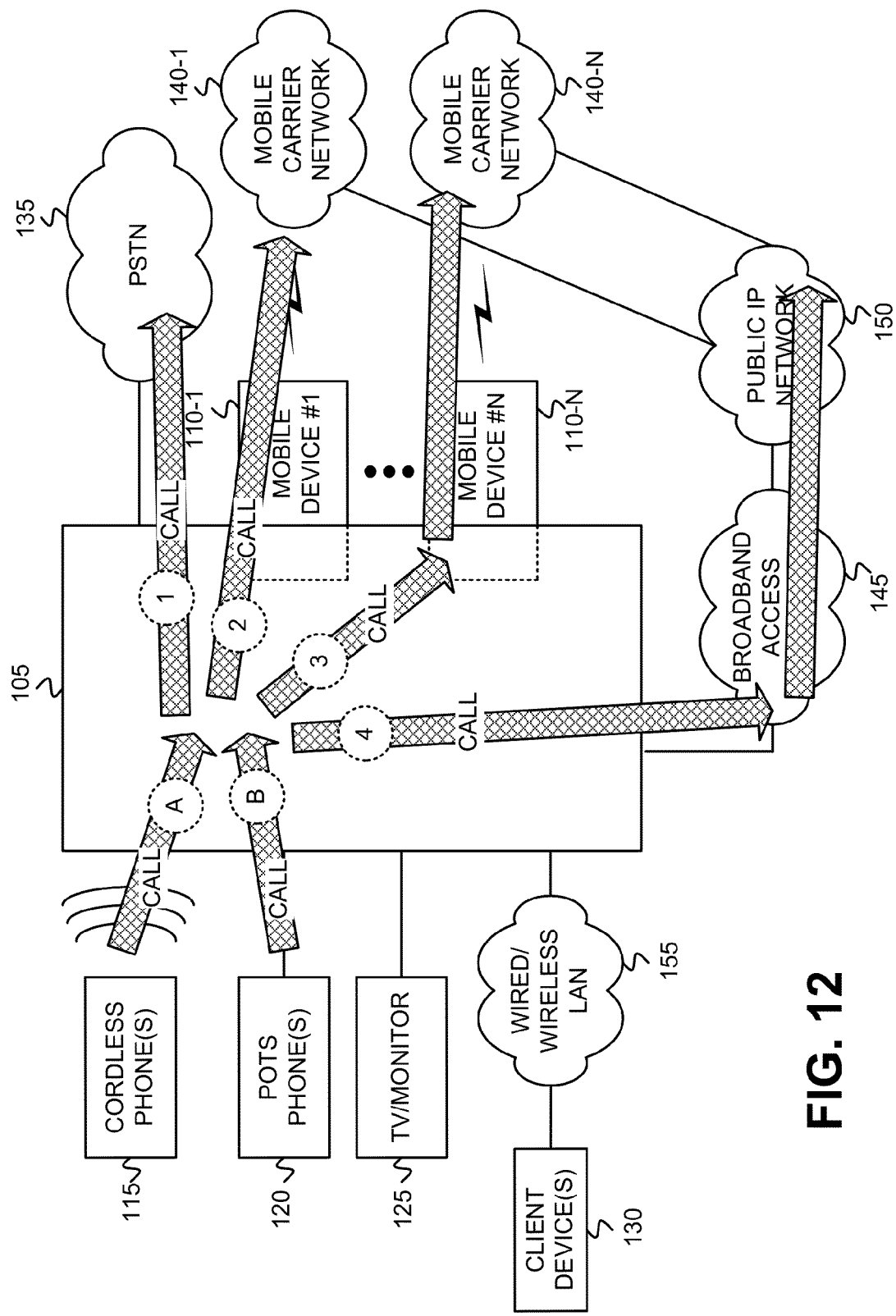
FIGS. 12-17 are diagrams that depict examples associated with the exemplary process of FIGS. 11A-11C.

If mobile device 110 does have a sufficient mobile carrier network connection (YES—block 1110), then docking station 105 may receive an outgoing call from cordless phone(s) 115 or POTS phone(s) 120 (block 1115). A user of docking station 105 may initiate a call at cordless phone 115 or POTS phone 120 via cordless I/F 155 or subscriber line I/F 160. Docking station 105 may send the outgoing call via PSTN 135, a selected mobile device 110, or broadband access network 145 based on user selection or docking station configuration settings (block 1120). Router/switch 800 may switch the outgoing call from cordless I/F 155 or subscriber line I/F 160 towards PSTN 135, a selected mobile device 110, or broadband access network 145. FIG. 12 depicts an outgoing call from cordless phone 115 (designated as "A") being received at docking station 105, or an outgoing call from POTS phone 120 (designated as "B") being received at docking station 105. FIG. 12 further depicts outgoing call A or B being routed via PSTN 135 (designated as "1"), via mobile device 110-1 and mobile carrier network 140-1 (designated as "2"), via mobile device 110-N and mobile carrier network 140-N (designated as "3"), or via broadband access network 145 (designated as "4").

Figure 13:
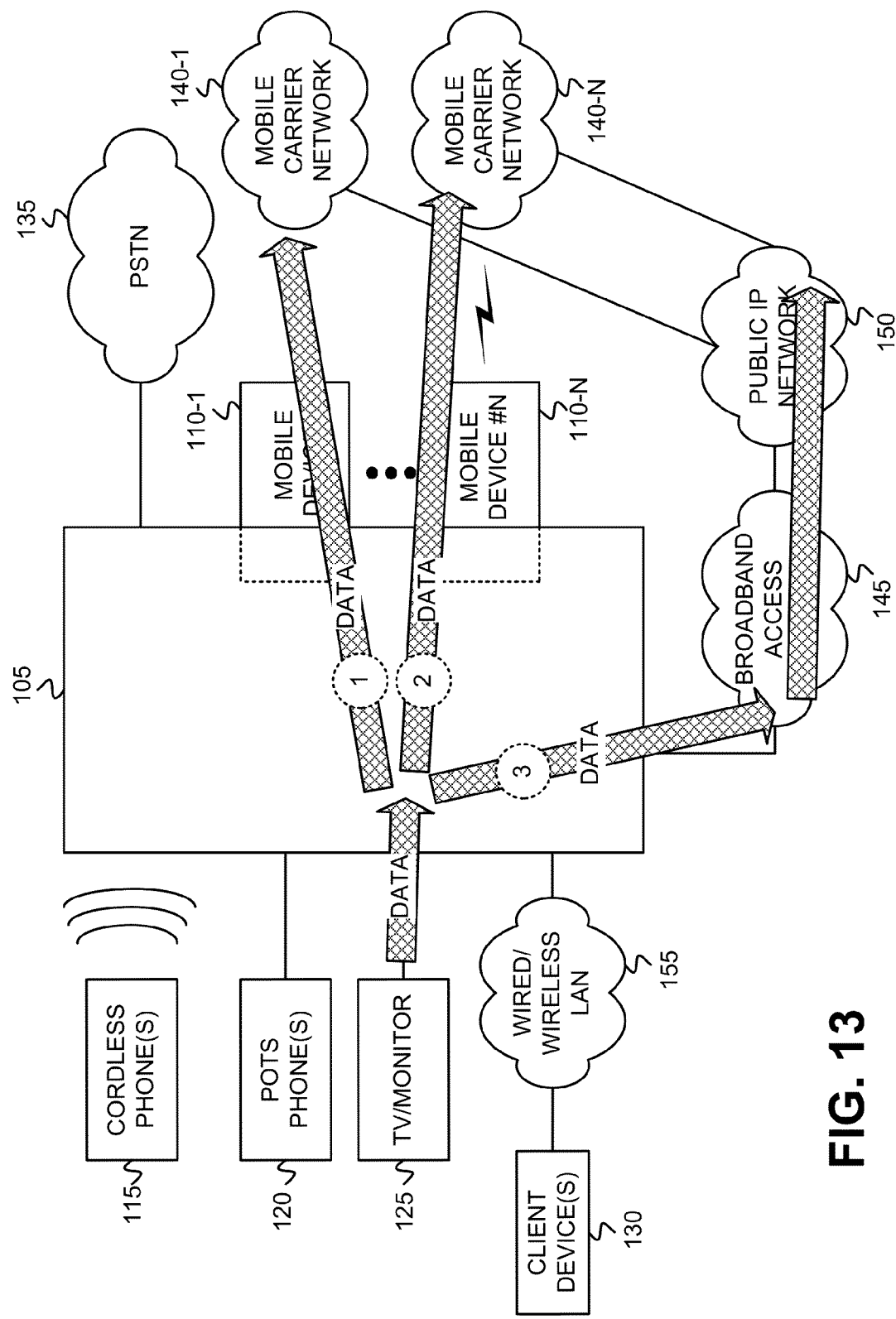

Docking station 105 may receive video-related data from TV/monitor 125 (block 1125). A user of TV/monitor 125 may, for example, enter control data into TV/monitor 125 (e.g., via a remote control) that is related to video being displayed at TV/monitor 125. Docking station 105 may send video-related data via a selected mobile device 110 or broadband access network 145 based on user selection or docking station configuration settings (block 1130). Router/switch 800 may switch the video-related data received from video I/F 165 towards the selected mobile device 110, or towards broadband access network 145. FIG. 13 depicts video-related data being received at docking station 105 from TV/monitor 125, and being routed via mobile device 110-1 and mobile carrier network 140-1 (designated as "1"), via mobile device 110-N and mobile carrier network 140-N (designated as "2"), or via broadband access network 145 (designated as "3"). If TV/monitor 125 includes a video telephony device, then the video-related data may include a video telephony call being connected to a destination via mobile device 110-1 and mobile carrier network 140-1, via mobile device 110-N and mobile carrier network 140-N, or via broadband access network 145.

Figure 14:
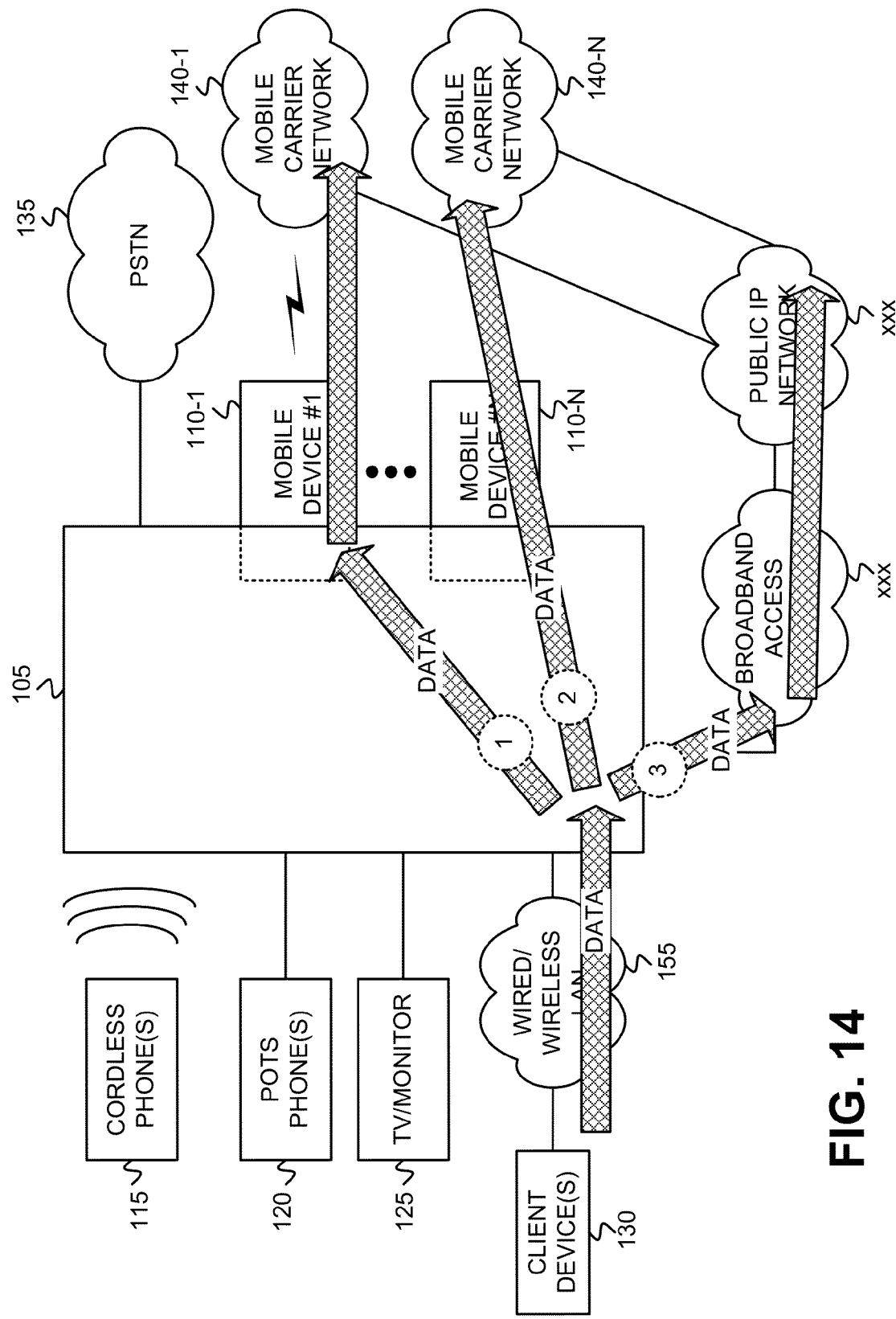

Docking station 105 may receive outgoing data from client device(s) 130 (block 1135) (FIG. 11B). Client device(s) 130 may generate packet data and send it via wired/wireless LAN 155 to broadband I/F 170 of docking station 105. Docking station 105 may route data towards its destination(s) via a selected mobile device 110, or via broadband access network 145, based on user selection or docking station configuration settings (block 1140). Router/switch 800 may route the packet data received from client device(s) 130 towards its destination via the selected mobile device 110, or via broadband I/F 170 and broadband access network 145. FIG. 14 depicts data being received at docking station 105 from client device(s) 130, and being routed via mobile device 110-1 and mobile carrier network 140-1 (designated as "1"), via mobile device 110-N and mobile carrier network 140-N (designated as "2"), or via broadband access network 145 (designated as "3"). The data from client device 130 may include, for example, a VoIP call that may be routed via mobile device 110-1 and mobile carrier network 140-1, via mobile device 110-N and mobile carrier network 140-N, or via broadband access network 145.

Figure 15:
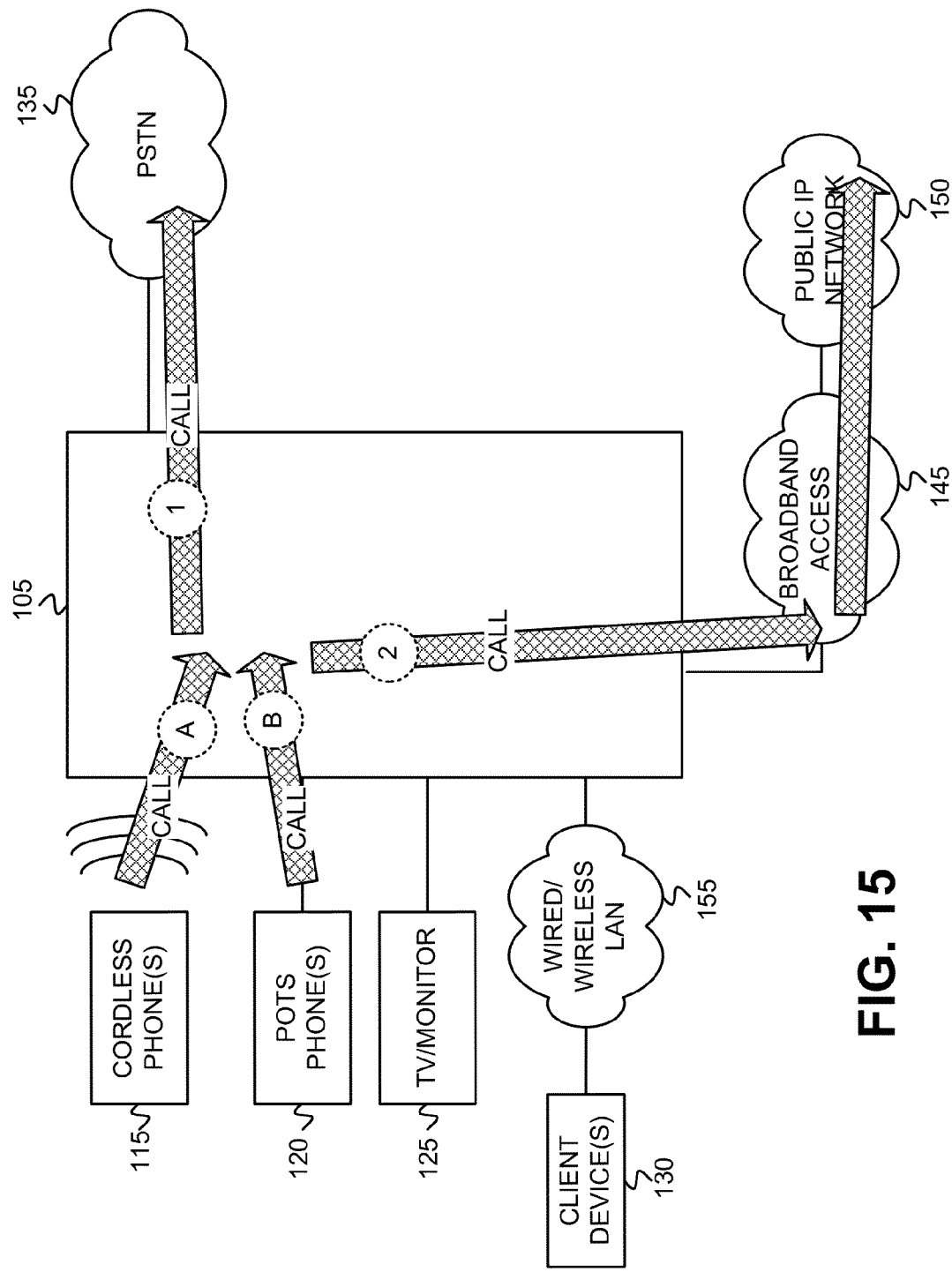

Returning to blocks 1105 and 1110, if mobile device 110 is not docked with docking station 105 (NO—block 1105), or mobile device 110 does not have a sufficient mobile carrier network connection (NO—block 1110), then docking station 105 may receive an outgoing call from cordless phone(s) 115 or POTS phone(s) 120 (block 1145) (FIG. 11C). A user of docking station 105 may initiate a call at cordless phone 115 or POTS phone 120 via cordless I/F 155 or subscriber line I/F 160. Docking station 105 may send the outgoing call via PSTN 135, or broadband access network 145 based on user selection or docking station configuration settings (block 1150). Router/switch 800 may switch the outgoing call from cordless I/F 155 or subscriber line I/F 160 towards PSTN 135 or broadband access network 145. FIG. 15 depicts an outgoing call from cordless phone 115 (designated as "A") being received at docking station 105, or an outgoing call from POTS phone 120 (designated as "B") being received at docking station 105. FIG. 15 further depicts outgoing call A or B being routed via PSTN 135 (designated as "1"), or via broadband access network 145 (designated as "2").

Figure 16:
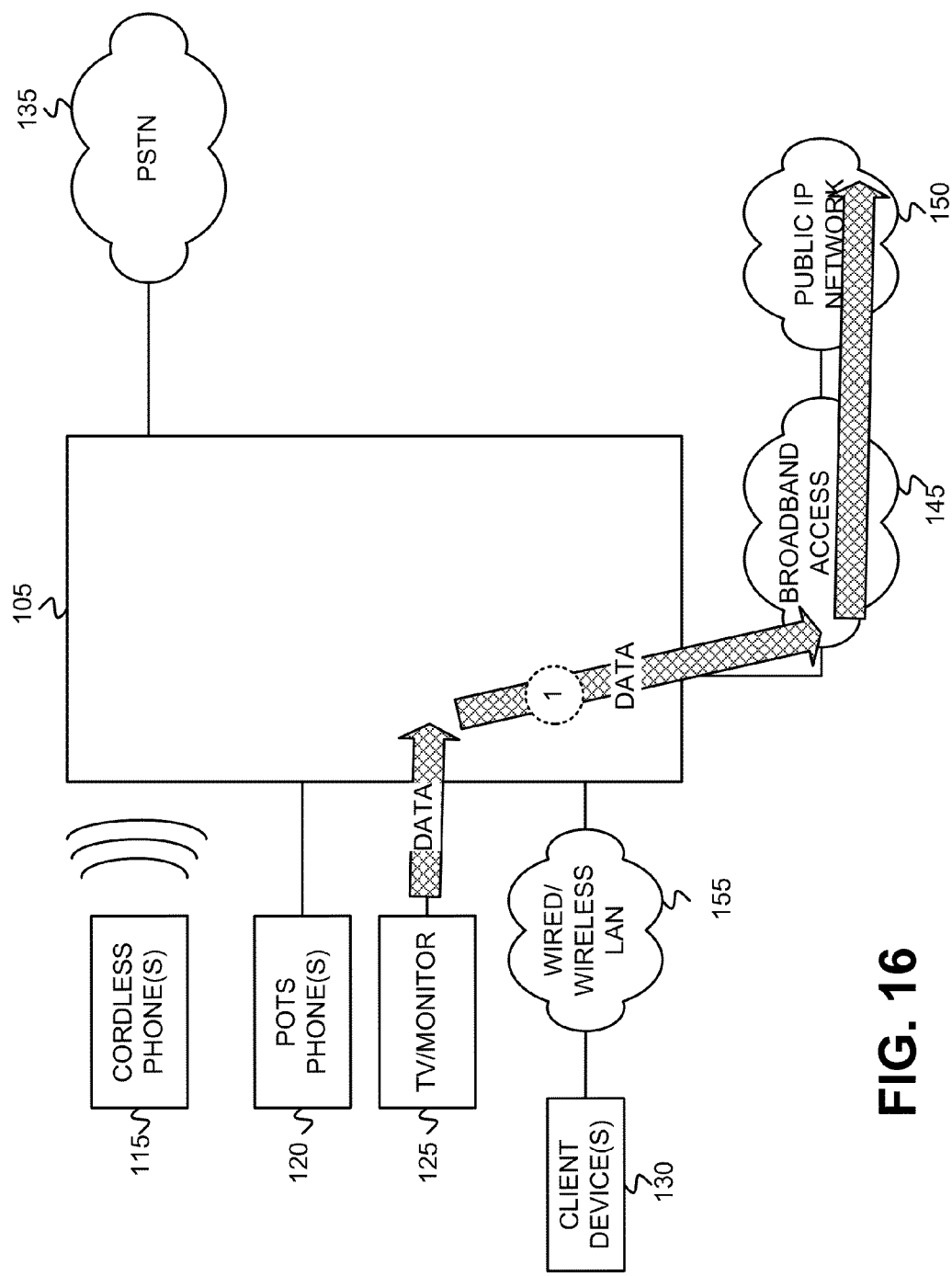

Docking station 105 may receive video-related data from TV/monitor 125 (block 1155). A user of TV/monitor 125 may, for example, enter control data into TV/monitor 125 (e.g., via a remote control) that is related to video being displayed at TV/monitor 125. Docking station 105 may send video-related data via broadband access network 145 (block 1160). Router/switch 800 may switch the video-related data received from video I/F 165 towards broadband access network 145. FIG. 16 depicts video-related data being received at docking station 105 from TV/monitor 125, and being routed via broadband access network 145 (designated as "1"). If TV/monitor 125 includes a video telephony device, then the video-related data may include a video telephony call being connected to a destination via broadband access network 145.

Figure 17:
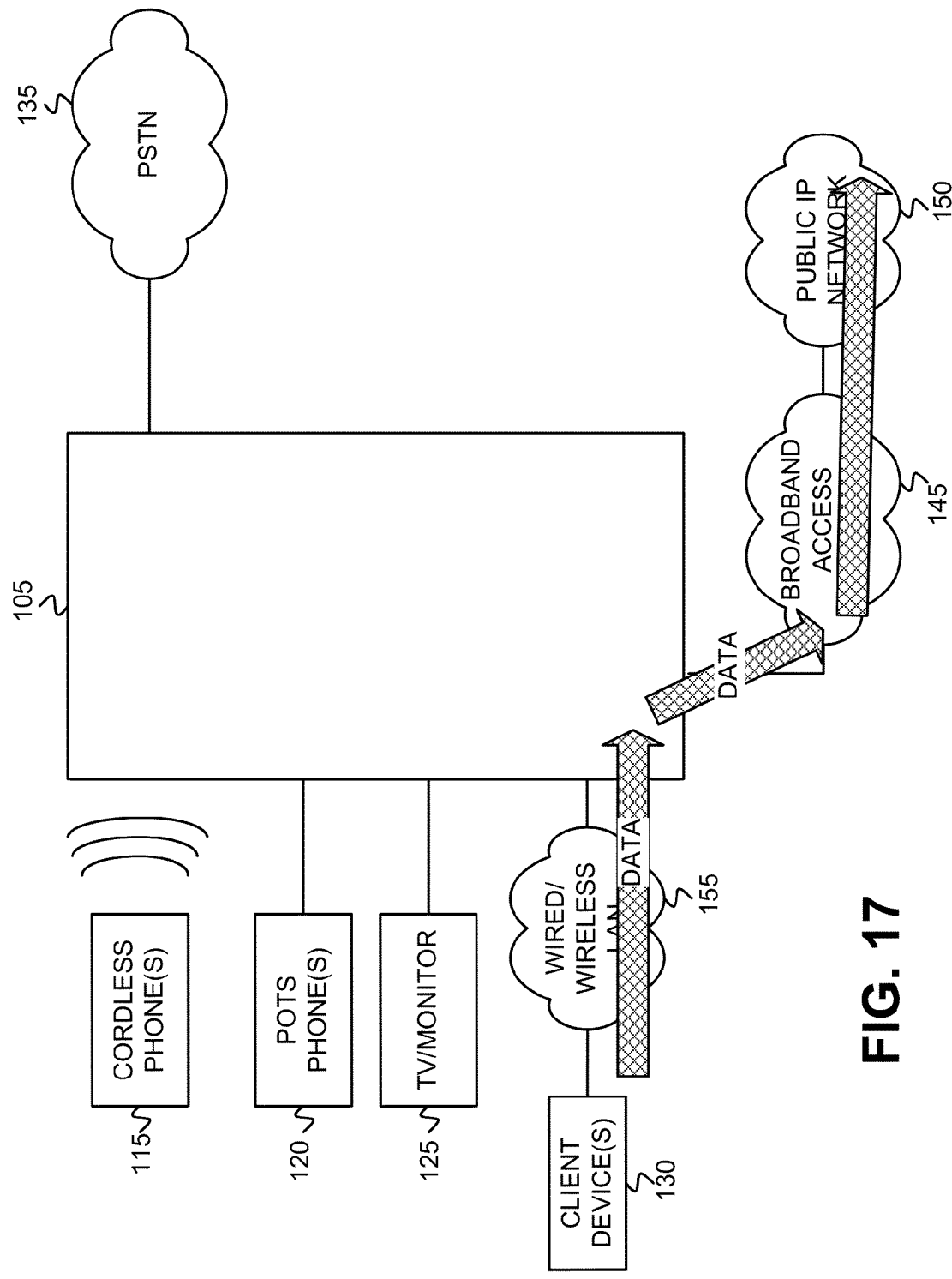

Docking station 105 may receive outgoing data from client device(s) 130 (block 1165). Client device(s) 130 may generate packet data and send it via wired/wireless LAN 155 to broadband I/F 170 of docking station 105. Docking station 105 may route the data towards its destination(s) via broadband access network 145 (block 1170). Router/switch 800 may route the packet data received from client device(s) 130 towards its destination via broadband I/F 170 and broadband access network 145. FIG. 17 depicts data being received at docking station 105 from client device(s) 130, and being routed via broadband access network 145. The exemplary process may continue at block 1105.

Figure 18A:
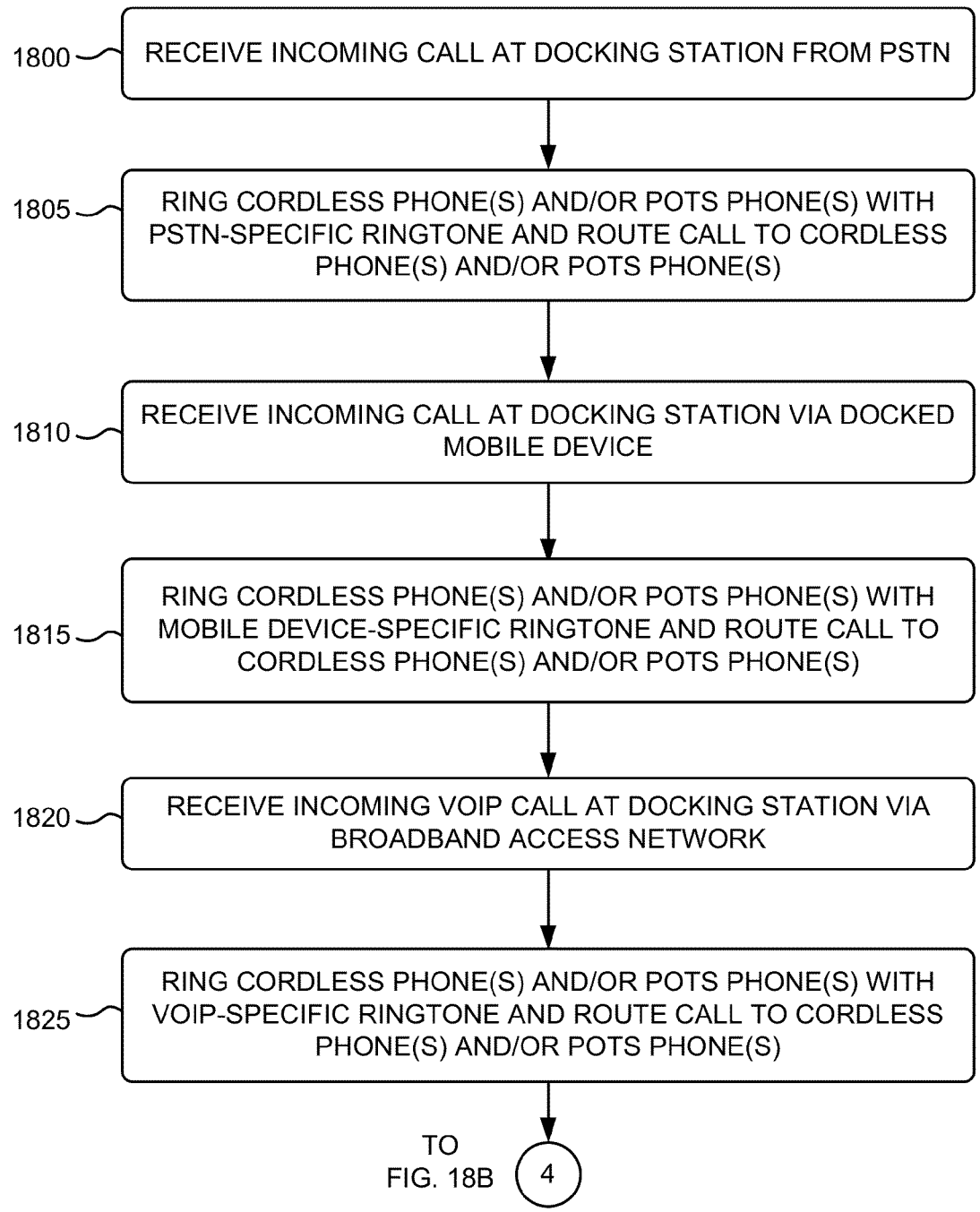
FIGS. 18A and 18B are flow diagrams that illustrate an exemplary process for routing incoming calls in the exemplary network environment.
Figure 18B:
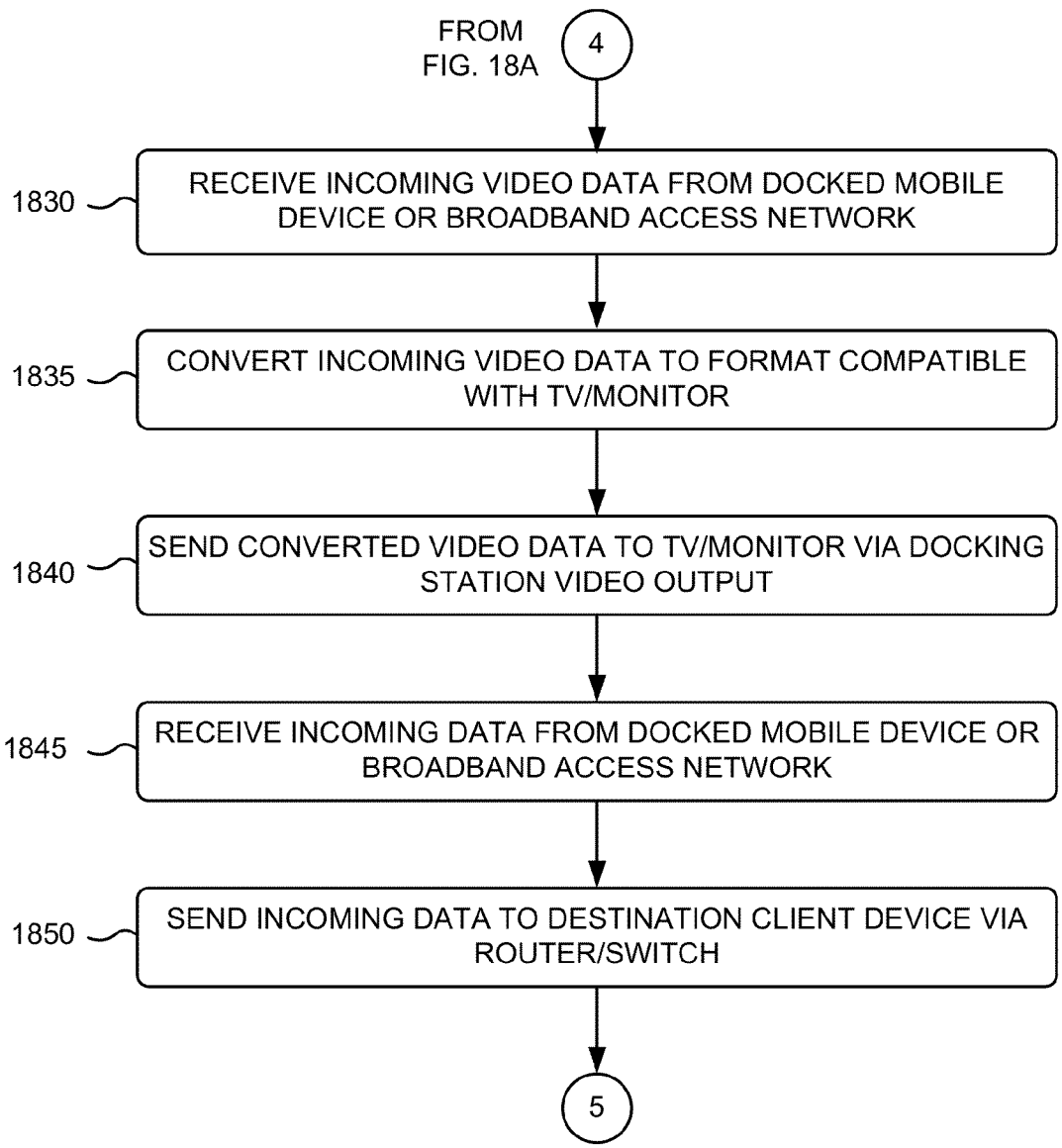

FIGS. 18A and 18B are flow diagrams that illustrate an exemplary process for routing incoming calls from the Public Switched Telephone Network (PSTN), the mobile carrier networks, or the broadband access network of FIG. 1A to the cordless phone(s), the Plain Old Telephone System phone(s), the TV/monitor, and the client device(s). The exemplary process of FIGS. 18A and 18B may be implemented by docking station 105.

Figure 19:
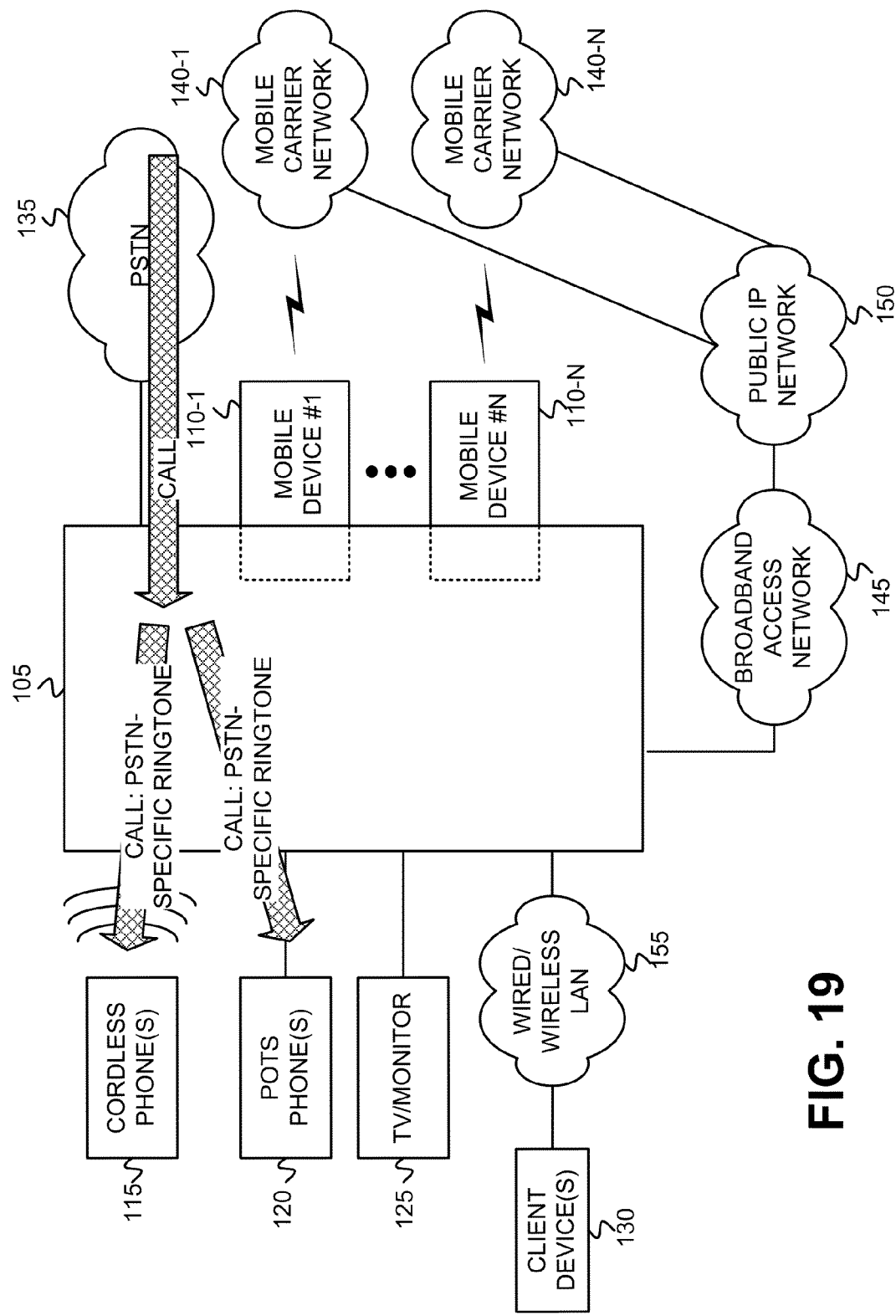
FIGS. 19-22 are diagrams that depict examples associated with the exemplary process of FIGS. 18A and 18B.

The exemplary process may include receiving an incoming call at docking station 105 from PSTN 135 (block 1800). FIG. 19 depicts a call being received at docking station 105 via PSTN 135. Docking station 105 may ring cordless phone(s) 115 and/or POTS phone(s) 120 with a PSTN-specific ringtone and may route the call through docking station 105 to cordless phone(s) 115 and/or POTS phone(s) 120 (block 1805). As shown in FIG. 19, docking station 105 may route the call to cordless phone(s) 115 and/or POTS phone(s) 120 and ring cordless phone(s) 115 and/or POTS phone(s) 120 with a PSTN-specific ringtone.

Figure 20:
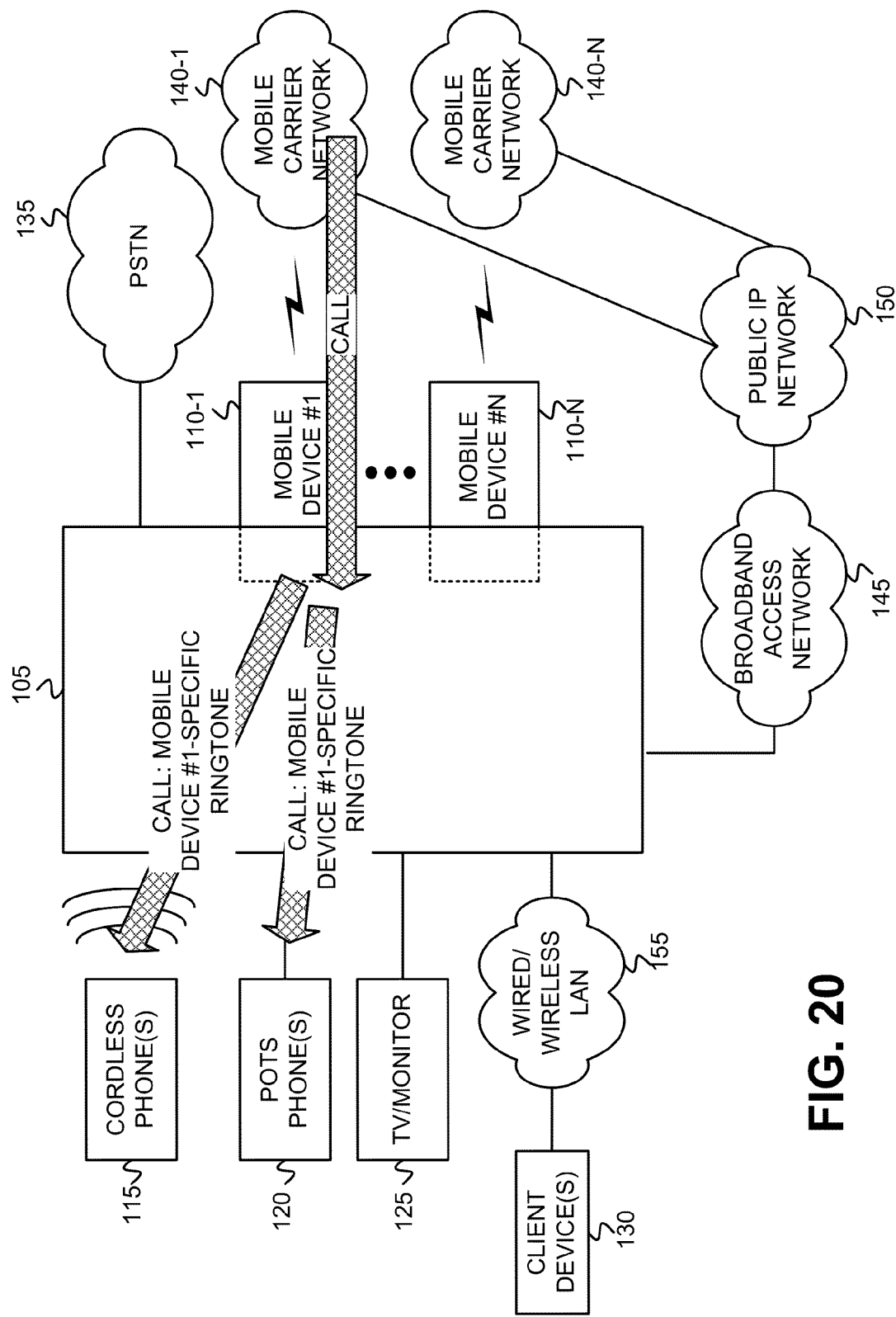

Docking station 105 may receive an incoming call via a docked mobile device 110 (block 1810). FIG. 20 depicts a call being received at docked mobile device 110-1 via mobile carrier network 140-1. A call to the wireless Mobile Directory Number (MDN) associated with a respective docked mobile device 110 may be received at docking station 105. Docking station 105 may ring cordless phone(s) 115 and/or POTS phone(s) 120 with a mobile device-specific ringtone and may route the call through docking station 105 to cordless phone(s) 115 and/or POTS phone(s) 120 (block 1815). As shown in FIG. 20, docking station 105 may route the call to cordless phone(s) 115 and/or POTS phone(s) 120 and ring cordless phone(s) 115 and/or POTS phone(s) 120 with a ringtone that is specific to mobile device 110-1.

Figure 21:
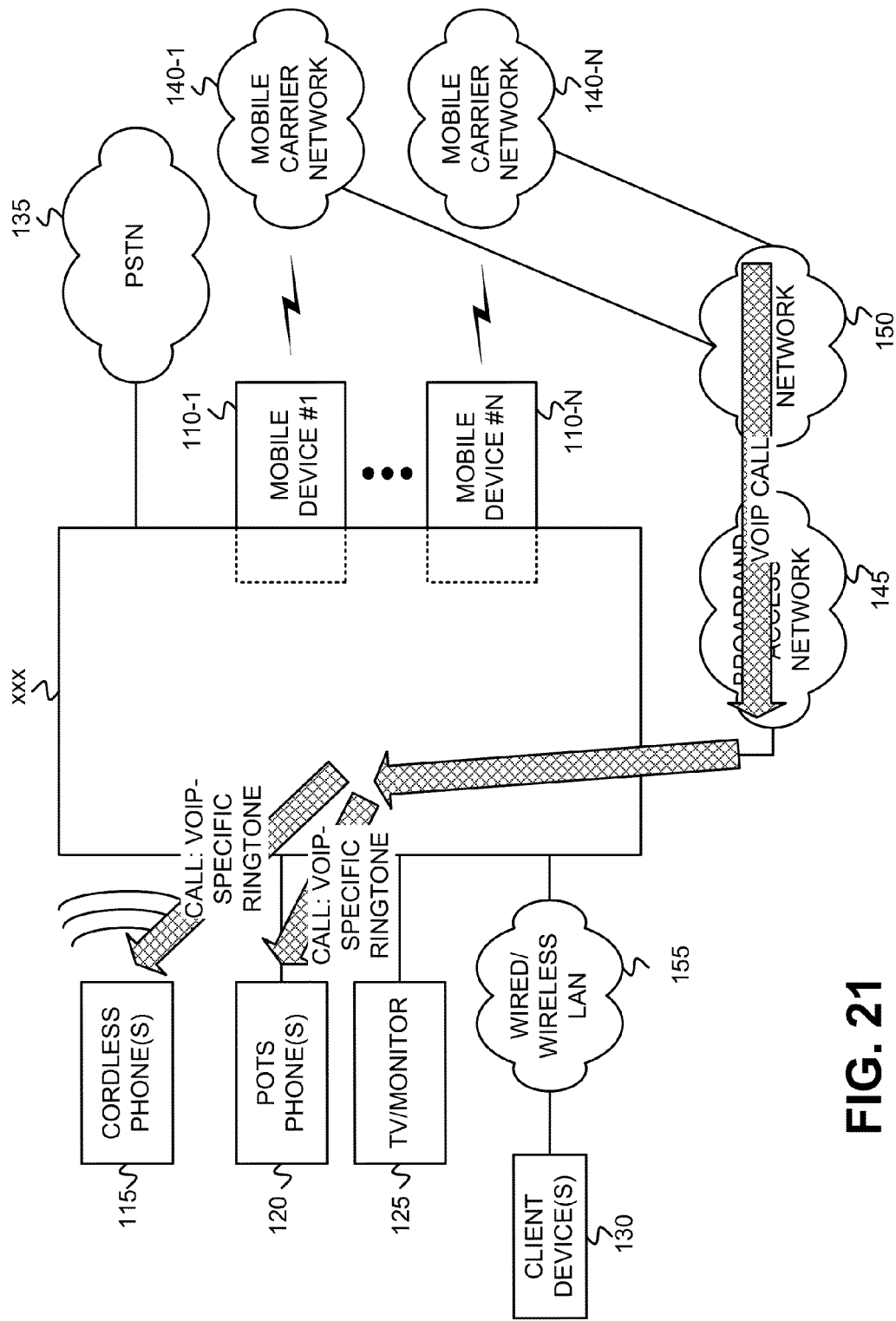

Docking station 105 may receive an incoming VoIP call via broadband access network 145 (block 1820). FIG. 21 depicts a call being received at docking station 105 via broadband access network 145 and public IP network 150. Docking station 105 may ring cordless phone(s) 115 and/or POTS phone(s) 120 with a VoIP-specific ringtone and may route the call to cordless phone(s) 115 and/or POTS phone(s) 120 (block 1825). As shown in FIG. 21 docking station 105 may route the call to cordless phone(s) 115 and/or POTS phone(s) 120 and ring cordless phone(s) 115 and/or POTS phone(s) 120 with a ringtone that is specific to a VoIP call. If VoIP calls for multiple different users are received at docking station 105, then the call for each different customer may have its own user-specific VoIP ringtone.

Figure 22:
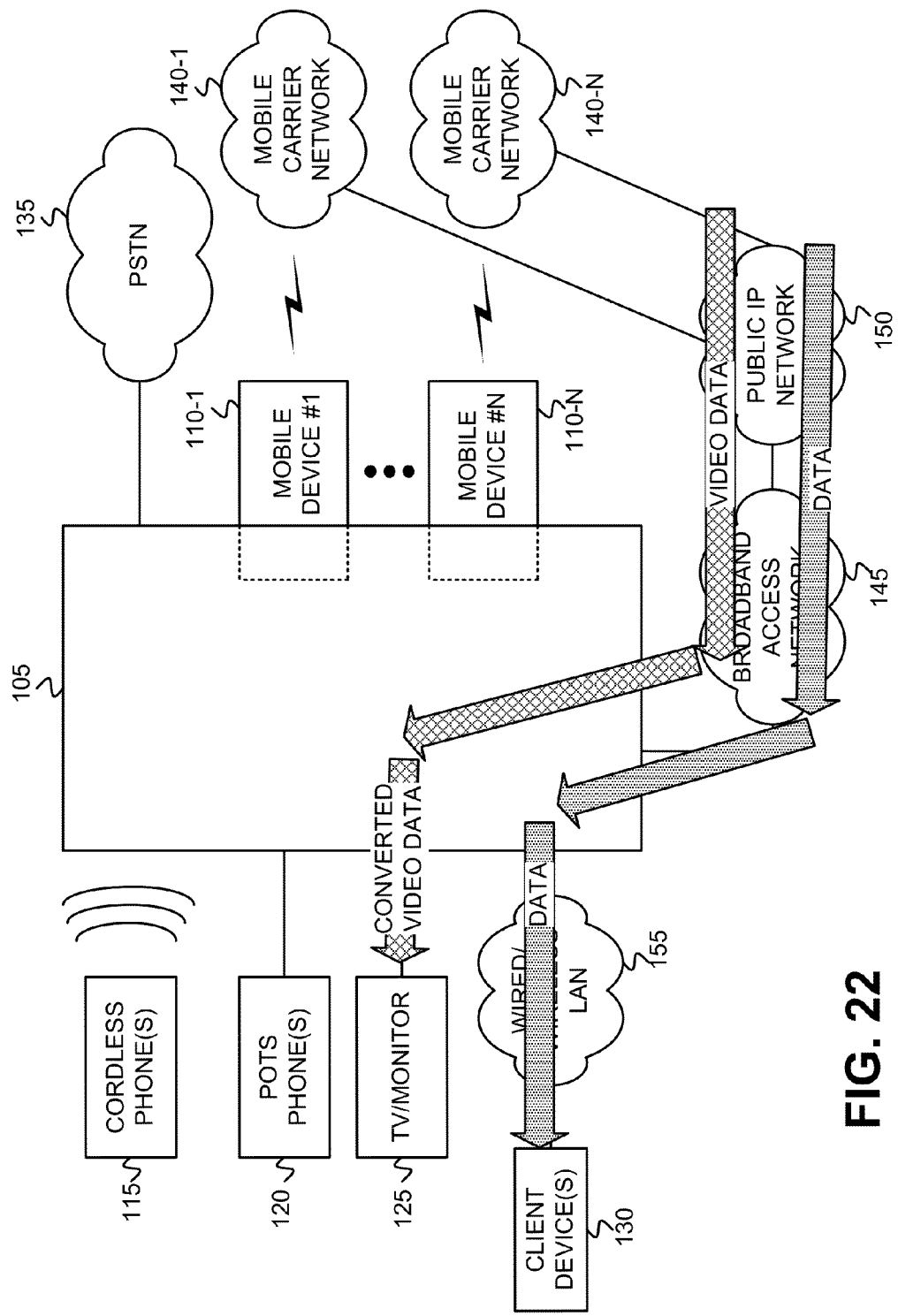

Docking station 105 may receive incoming video data from a docked mobile device 110 or broadband access network 145 (block 1830). FIG. 22 depicts video data being received at docking station 105 via broadband access network 145 and public IP network 150. Docking station 105 may convert the incoming video data to a format compatible with TV/monitor 125 (block 1835) and may send the converted video data to TV/monitor via video I/F 165 (block 1840). As shown in FIG. 22, docking station 105 may route video data received via broadband access network 145 to TV/monitor 125. If TV/monitor 125 includes a video telephony device, then the video data may include a video telephony call originating from a video telephony source (not shown).

Docking station 105 may receive incoming data from a docked mobile device 105 or broadband access network 145 (block 1845). FIG. 22 depicts data being received at docking station 105 via broadband access network 145 and public IP network 150. Docking station 105 may send the incoming data to a client device(s) 130 (block 1850). As shown in FIG. 22, docking station 105 may route data received via broadband access network 145 to client device(s) 130.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 10, 11A-11C, 18A, and 18B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving a first call at a docking station via a first mobile device docked in the docking station, wherein the first mobile device includes a cellular telephone, a tablet computer, or a personal digital assistant (PDA);
   receiving a second call at the docking station via a second mobile device docked in the docking station, wherein the second mobile device includes a cellular telephone, a tablet computer, or a PDA;
   ringing one or more Plain Old Telephone Service (POTS) or one or more cordless phones connected to the docking station and to a Public Switched Telephone Network (PSTN) with a first ringtone specific to the first mobile device; and
   ringing the one or more POTS or the one or more cordless phones connected to the docking station and to the PSTN with a second ringtone specific to the second mobile device.

2. The method of claim 1, further comprising:
   routing the first call through the docking station to the one or more POTS or one or more cordless phones; and
   routing the second call through the docking station to the one or more POTS or one or more cordless phones.

3. The method of claim 1, wherein the second ringtone is different than the first ringtone.

4. The method of claim 1, wherein the first mobile device is connected to a first mobile carrier network via a first wireless link and the first call is received by the first mobile device via the first mobile carrier network.

5. The method of claim 4, wherein the second mobile device is connected to a second mobile carrier network via a second wireless link.

6. The method of claim 5, wherein the second mobile carrier network is different than the first mobile carrier network.

7. The method of claim 1, wherein the PSTN is connected to the docking station, the method further comprising:
   receiving a third call at the docking station via the PSTN; and
   ringing the one or more POTS or the one or more cordless phones connected to the docking station with a third ringtone specific to the PSTN.

8. The method of claim 7, further comprising:
   routing the third call through the docking station to the one or more POTS or the one or more cordless phones.

9. The method of claim 1, further comprising:
   receiving a fourth call at the docking station via a broadband access network connected to the docking station, wherein the fourth call comprises a Voice over Internet Protocol (VoIP) call; and
   ringing the one or more POTS or the one or more cordless phones connected to the docking station with a fourth ringtone specific to the fourth call being a VoIP call.

10. The method of claim 1, further comprising:
    receiving incoming video data from the first or second docked mobile devices or a broadband access network connected to the docking station;
    converting, at the docking station, the video data into a television or monitor-compatible format; and
    sending the converted video data to a television or a monitor connected to the docking station.

11. The method of claim 1, further comprising:
    receiving incoming data from the first or the second docked mobile devices or a broadband access network connected to the docking station; and
    sending the incoming data to one or more destination client devices via a wired or wireless local area network (LAN) connected to the docking station.

12. The method of claim 1, wherein the first and second mobile devices each comprise a portable digital computing device that includes the capability to communicate via a mobile carrier network or via other network connections.

13. A docking station, comprising:
    a first docking port configured to physically dock with a first mobile device, wherein the first docking port includes a Universal Serial Bus (USB) port;
    a second docking port configured to physically dock with a second mobile device;
    a subscriber line interface connected to one or more Plain Old Telephone Service (POTS) phones and to a Public Switched Telephone Network (PSTN); and
    a switch configured to:
      receive a first call via the first mobile device docked in the docking station,
      receive a second call via the second mobile device docked in the docking station, and
      route the first call and the second call to the subscriber line interface,
      wherein the subscriber line interface rings the one or more POTS phones with a first ringtone specific to the first mobile device, and
      wherein the subscriber line interface rings the one or more POTS phones with a second ringtone specific to the second mobile device.

14. The docking station of claim 13, wherein the second docking port comprises a USB port.

15. The docking station of claim 13, wherein the first mobile device comprises a portable digital computing device that includes the capability to communicate via a mobile carrier network or via other network connections.

16. The docking station of claim 13, wherein the first and second mobile devices each comprise a cellular telephone, a tablet computer, or a personal digital assistant (PDA).

17. The docking station of claim 13, further comprising:
    a cordless interface connected to one or more cordless telephones;
    wherein the switch is further configured to route the first call to the cordless interface, and
    wherein the cordless interface rings the one or more cordless telephones with a first ringtone specific to the first mobile device.

18. The docking station of claim 17, wherein the switch is further configured to route the second call to the cordless interface, and
    wherein the cordless interface rings the one or more cordless telephones with a second ringtone specific to the second mobile device.

19. The docking station of claim 13, wherein the PSTN is connected to the docking station, and wherein the switch is further configured to:
    receive a third call at the docking station via the PSTN; and
    route the third call to the subscriber line interface,
    wherein the subscriber line interface rings the one or more POTS phones with a ringtone specific to the PSTN.

20. The docking station of claim 13, wherein the switch is configured to:
- receive a fourth call at the docking station via a broadband access network connected to the docking station, wherein the fourth call comprises a Voice over Internet Protocol (VoIP) call, and
- route the fourth call to the subscriber line interface,
- wherein the subscribe line interface rings the one or more POTS phones with a ringtone specific to the fourth call being a VoIP call.

21. A docking station, comprising:
- a first docking port configured to physically dock with a first mobile device, wherein the first docking port includes a Universal Serial Bus (USB) port;
- a second docking port configured to physically dock with a second mobile device, wherein the second docking port includes a USB port,
- wherein the first and second mobile devices each comprise a portable digital computing device that include a capability to communicate via a mobile carrier network or via other network connections,
- a subscriber line interface connected to one or more Plain Old Telephone Service (POTS) phones and to a Public Switched Telephone Network (PSTN);
- a cordless interface connected to one or more cordless telephones and to the PSTN; and
- a switch configured to:
  - receive a first call via the first mobile device docked in the docking station,
  - receive a second call via the second mobile device docked in the docking station,
  - route the first and second calls to the subscriber line interface,
  - wherein the subscriber line interface rings the one or more POTS phones with a first ringtone specific to the first mobile device, and
  - wherein the subscriber line interface rings the one or more POTS phones with a second ringtone specific to the second mobile device.

22. The docking station of claim 21, wherein the first and second mobile devices each comprise a cellular telephone, a tablet computer, or a personal digital assistant (PDA).

23. The docking station of claim 21, wherein the first mobile device is connected to a first mobile carrier network via a first wireless link, wherein the second mobile device is connected to a second mobile carrier network via a second wireless link, and wherein the first mobile carrier network is different than the second mobile carrier network.

* * * * *